US012488691B2

(12) United States Patent
Jang et al.

(10) Patent No.: US 12,488,691 B2
(45) Date of Patent: Dec. 2, 2025

(54) METHOD AND APPARATUS FOR GENERATING AN INTEGRATED ELECTRONIC CHART FOR ROUTE SETTING

(71) Applicant: AVIKUS CO., LTD., Seoul (KR)

(72) Inventors: Wang Seok Jang, Seoul (KR); Sae Yong Park, Seoul (KR); Gwang Hyeok Choi, Seoul (KR); Jun Sik Lee, Seoul (KR)

(73) Assignee: AVIKUS CO., LTD., Seoul (KR)

( * ) Notice: Subject to any disclaimer, the term of this patent is extended or adjusted under 35 U.S.C. 154(b) by 0 days.

(21) Appl. No.: 18/927,994

(22) Filed: Oct. 26, 2024

(65) Prior Publication Data

US 2025/0046194 A1  Feb. 6, 2025

Related U.S. Application Data

(63) Continuation of application No. PCT/KR2024/000543, filed on Jan. 11, 2024.

(30) Foreign Application Priority Data

Jan. 11, 2023 (KR) .................. 10-2023-0004040

(51) Int. Cl.
*G08G 3/00* (2006.01)
*G01C 21/20* (2006.01)
(Continued)

(52) U.S. Cl.
CPC ............ *G08G 3/02* (2013.01); *G01C 21/203* (2013.01); *B63B 79/40* (2020.01); *G01C 21/3841* (2020.08); *G01C 21/387* (2020.08)

(58) Field of Classification Search
CPC . G08G 3/00; G08G 3/02; G01C 21/00; G01C 21/20; G01C 21/203; G01C 21/3841; G01C 21/3833; B63B 51/00; B63B 79/40
(Continued)

(56) References Cited

U.S. PATENT DOCUMENTS 10,507,895 B2 * 12/2019 Grace ................. B63B 79/15
10,571,275 B2 *  2/2020 Silfven .............. G01C 21/203
(Continued)

FOREIGN PATENT DOCUMENTS

| AU | 2015300683 A1 * | 3/2017 | ............ B63J 99/00 |
|----|----|----|----|
| CN | 103164516 B * | 4/2017 | ............ G06F 17/30 |

(Continued)

OTHER PUBLICATIONS

An English-translated version of JP2021144149A by Yanmar Power Technology Ltd Co (Year: 2021).*

(Continued)

*Primary Examiner* — Cuong H Nguyen
(74) *Attorney, Agent, or Firm* — Harvest IP Law, LLP

(57) ABSTRACT

The present disclosure relates to a method and a device generating a navigational route using an integrated electronic chart, which includes receiving a plurality of electronic charts with different scales; extracting at least one overlapping area of the plurality of electronic charts; integrating the plurality of electronic charts into the integrated electronic chart; dividing the integrated electronic chart into a configurable grid; generating an initial route using first object information in the configurable grid; mapping second object information detected by a sensing device onto the integrated electronic chart; and resetting the initial route using the second object information. According to the method and device of the present disclosure, the integrated electronic chart allows for efficient use of computing (Continued)

resources. Overall route calculation time and memory usage is reduced, and each area is accurately expressed.

19 Claims, 26 Drawing Sheets

(51) Int. Cl.
  *G08G 3/02* (2006.01)
  *B63B 79/40* (2020.01)
  *G01C 21/00* (2006.01)
(58) Field of Classification Search
  USPC .......................................................... 701/423
  See application file for complete search history.

(56) References Cited

U.S. PATENT DOCUMENTS

| | | | |
|---|---|---|---|
| 11,597,480 B2 * | 3/2023 | Bignonet | G01C 21/203 |
| 11,699,007 B2 | 7/2023 | Son | |
| 2017/0083023 A1 * | 3/2017 | Park | G05D 1/0274 |
| 2017/0131721 A1 * | 5/2017 | Kwak | G05D 1/0044 |
| 2017/0254649 A1 * | 9/2017 | Carnevali | G01C 21/20 |
| 2018/0190129 A1 | 7/2018 | Park | |
| 2022/0262115 A1 * | 8/2022 | Zhang | G06T 7/74 |
| 2023/0144543 A1 * | 5/2023 | Dake | G01C 21/3881 |
| | | | 701/450 |

FOREIGN PATENT DOCUMENTS

| | | | | | |
|---|---|---|---|---|---|
| CN | 106909869 A | * | 6/2017 | ............ | G06K 7/1417 |
| CN | 114116106 A | * | 3/2022 | ............ | G06F 9/451 |
| CN | 111133494 B | * | 4/2022 | ............ | G09B 29/00 |
| JP | 2003194551 A | | 7/2003 | | |
| JP | 2009-229824 A | | 10/2009 | | |
| JP | 5369268 B1 | | 12/2013 | | |
| JP | 2018-049639 A | | 3/2018 | | |
| JP | 2021-144149 A | | 9/2021 | | |
| KR | 10-2012-0065045 A | | 6/2012 | | |
| KR | 10-1275277 B1 | | 6/2013 | | |
| KR | 10-1850866 B1 | | 4/2018 | | |
| KR | 10-1920707 B1 | | 11/2018 | | |
| KR | 10-1976403 B1 | | 8/2019 | | |
| KR | 10-2021-0063841 A | | 6/2021 | | |
| WO | WO-2021182270 A1 | * | 9/2021 | ........... | G01C 21/203 |

OTHER PUBLICATIONS

Li, Ruizhou, and Haiyun Jiang. "Graph-to-vision: Multi-graph understanding and reasoning using vision-language models." arXiv preprint arXiv:2503.21435 (2025). (Year: 2025).*
Huang, Liang, et al. "Generation and application of maritime route networks: overview and future research directions." IEEE Transactions on Intelligent Transportation Systems (2024). (Year: 2024).*
Zygouras, Nikolas, Alexandros Troupiotis-Kapeliaris, and Dimitris Zissis. "Envclus*: Extracting common pathways for effective vessel trajectory forecasting." IEEE Access 12 (2024): 3860-3873. (Year: 2024).*
International Search report.
Time-Varying Risk Measurement for Ship Collision Prevention.
The European Search Report dated Aug. 13, 2025 in counterpart EP application No. 23913039.6.

* cited by examiner

METHOD AND APPARATUS FOR GENERATING AN INTEGRATED ELECTRONIC CHART FOR ROUTE SETTING

CROSS REFERENCE TO RELATED APPLICATION

This application is a continuation application of International Application No. PCT/KR2024/000543 filed on Jan. 11, 2024, which claims priority from Korea Patent Application No. 10-2024-0004656 filed on Jan. 11, 2024, the entire contents of which are incorporated herein for all purpose by this reference.

TECHNICAL FIELD

The present disclosure relates to a method and device for generating an integrated electronic chart, and using an integrated electronic chart generated for a route setting.

BACKGROUND

Examples of data used by large ships including large commercial ships to identify other ships and surrounding environments include data collected from sensors such as an automatic identification system (AIS), a radar (radio detection and ranging), a global positioning system (GPS), a gyrocompass, or an inertial measurement unit (IMU), and electronic charts in a pre-configured database (DB) format.

In the related art, Son (KR101275277B1) uses electronic chart information from an electronic chart in a pre-configured DB format as it is, generates a quadrangular unit route from the electronic chart information, and calculates an avoidance route within the quadrangular unit route.

In addition, a radar is a device that needs to be installed mandatorily on large ships, and is used to recognize and track nearby ships and obstacles and monitor a collision risk.

In addition, an AIS is a device that needs to be installed mandatorily on large ships, and collects data transmitted from nearby ships and major buoys, and uses the results in conjunction with a radar or an electronic chart. In addition, data from a GPS, a gyrocompass, and an IMU are linked with other data to express a past movement route, a current position, and a pose state of a host ship.

To allow users to seamlessly check such data, on large ships, data from each sensor is shown on three to five displays placed in the center of a navigation room. On small ships, because the space is limited, sensor data of each sensor is displayed by using one to two multifunction displays (MFDs).

However, because data from each sensor is only listed separately and not fully integrated, duplicate results for the same object are displayed on separate screens, which may cause user confusion.

In the related art, Son describes navigation information of a host ship and navigation information of another ship are obtained from a plurality of sensors, but it is not possible to process sensor data repeatedly sensed for the same object. Furthermore, because data from an AIS, a radar, an electronic chart, and the like is implemented for large ships, their accuracy is significantly lower in narrow waterways or berthing areas, which are typical navigation environments for small ships, rendering the data unusable for use on small ships.

In addition, data from a radar sensor contains a lot of meaningless object information irrelevant to navigation of a host ship, and an electronic chart contains a lot of information unnecessary for determination of various routes. Consequently, there is a problem of insufficient computing device resources when attempting to determine a driving route using the data from the radar sensor and the electronic chart without separate preprocessing.

SUMMARY

The present disclosure provides a method and device for generating an integrated electronic chart. In addition, the present disclosure provides a non-transitory computer-readable medium having computer executable instructions that, when executed by a processor, perform the method.

In addition, the present disclosure provides a route setting method and device using an integrated electronic chart. In addition, the present disclosure provides a non-transitory computer-readable medium having computer executable instructions that, when executed by a processor, perform the method.

Technical objectives of the present disclosure are not limited to the foregoing, and other unmentioned objectives or advantages of the present disclosure would be understood from the following description and be more clearly understood from the embodiments of the present disclosure. In addition, it would be appreciated that the objectives and advantages of the present disclosure may be implemented by means provided in the claims and a combination thereof.

According to an embodiment of the present disclosure, provided is a method of generating a navigational route using an integrated electronic chart, the method including: receiving a plurality of electronic charts with different scales; extracting at least one overlapping area of the plurality of electronic charts; integrating the plurality of electronic charts into the integrated electronic chart by applying an overlapping area from an electronic chart with the largest scale among the plurality of electronic charts to a corresponding overlapping area of the at least one overlapping area based on the at least one overlapping area and a scale; dividing the integrated electronic chart into a configurable grid; generating an initial route using first object information contained in the configurable grid; mapping second object information detected by a sensing device onto the integrated electronic chart; and resetting the initial route using the mapped second object information.

In the present disclosure, the integrating may include: classifying the plurality of electronic charts based on the at least one overlapping area; selecting one of the classified electronic charts as a first electronic chart; and based on there being a second electronic chart among the classified electronic charts that includes the overlapping area included in the first electronic chart and has a larger scale than the first electronic chart, changing the overlapping area of the first electronic chart to the overlapping area of the second electronic chart.

In the present disclosure, the method may further include dividing the integrated electronic chart into the configurable using a quadtree according to the presence or absence of an object.

In the present disclosure, the method may further include storing attribute information of the configurable grid in the integrated electronic chart, the attribute information being generated based on information about the configurable grid and information about the object included in the configurable grid.

In the present disclosure, the attribute information of the grid may include a route setting weight determined based on a distance between the configurable grid and a land.

In the present disclosure, the classifying the plurality of electronic charts is performed based on one or more of chart numbers, chart names, and code numbers of the plurality of electronic charts, and the dividing the integrated electronic chart into the grid further comprises repeatedly dividing the configurable grid using the quadtree until a resulting grid contains preset object information, and the dividing the integrated electronic chart further comprises object interpolation based on a plurality of points corresponding to objects included in the integrated electronic chart and edges connecting the plurality of points to each other.

According to another embodiment of the present disclosure, provided is a route setting device including: at least one memory; and at least one processor, wherein the at least one processor is configured to receive a plurality of electronic charts, each comprising a configurable grid containing first object information, wherein the plurality of electronic chart is combined to create an integrated electronic chart using an electronic chart with the largest scale for each overlapping area of the plurality of electronic charts, receive data including second object information from at least one sensor, generate integrated object information by mapping the second object information to the configurable grid based on the first object information and the second object information, display the integrated object information, generate an initial route using the integrated electronic chart, and resetting the initial route using the integrated object information.

In the present disclosure, the at least one processor is further configured to generate the integrated object information by excluding the second object information mapped to the configurable grid containing the first object information.

In the present disclosure, the first object information and the second object information include probability information regarding at least one of a presence, a location, a size, a speed, and a direction of an object, and the at least one processor is further configured to generate integrated probability information by integrating the probability information, and generate the integrated object information by mapping the integrated probability information to the configurable grid.

In the present disclosure, the at least one processor may be further configured to generate the integrated object information by identifying a subset of a plurality of pieces of second object information indicating the same object sensed in a preset area.

In the present disclosure, an avoidance route may be set by connecting configurable grids on which the integrated object information is not mapped or configurable grids with low collision risks in the electronic chart.

In the present disclosure, the at least one processor is further configured to calculate a probability-based collision risk for configurable grids of the integrated electronic chart based on at least one of the first object information and the second object information, and set the collision avoidance route by considering the probability-based collision risk and a possibility of a host ship avoiding a collision.

In the present disclosure, the route setting device may further include a display unit configured to display at least one of the integrated object information, the probability-based collision risk, and the collision avoidance route.

In the present disclosure, the at least one processor may be further configured to set a plan route from an origin to a destination based on the integrated electronic chart. In addition, the at least one processor is further configured to generate the integrated object information by performing object filtering using land information of the integrated electronic chart and a noise removal algorithm. Furthermore, the at least one processor is further configured to generate the integrated object information by selecting only objects corresponding to navigational obstacles based on sensor fusion of the first object information acquired from the integrated electronic chart and the second object information filtered using a noise removal algorithm.

In addition, a computer-readable medium having computer executable instructions that, when executed by a processor, perform the methods may be further provided.

Other aspects, features, advantages other than those described above will become apparent from the following drawings, claims, and detailed description of the present disclosure.

According to an embodiment of the present disclosure, when first object information exists on an electronic chart, by performing division using a configurable grid to reduce the number of grids including areas without the first object information and increasing the resolution mainly for areas where the first object information exists, computing resources may be used efficiently.

In addition, according to an embodiment of the present disclosure, the overall capacity of an integrated electronic chart may be reduced by performing division using a configurable grid, and as a time required for analysis of the electronic chart is reduced as much as the reduction in the capacity, an overall route calculation time and memory usage may be reduced.

In addition, according to an embodiment of the present disclosure, it is possible to obtain an integrated electronic chart in which each area is accurately expressed by integrating electronic charts with the largest scale in an overlapping area of the electronic charts.

In addition, according to an embodiment of the present disclosure, by performing fusion on sensor data from an existing automatic identification system (AIS) or radar (radio detection and ranging), which is not suitable for a narrow-waterway navigation environment of small ships, the recognition accuracy of short-distance second objects that were not previously recognized may be improved, and by performing sensor fusion on sensor data from the AIS or radar using a camera, the recognition accuracy of second objects at middle to long distances may also be improved.

In addition, according to an embodiment of the present disclosure, displaying fused sensor data on one screen rather than on separate screens can more easily assist a user in keeping eyes forward.

Effects of the present disclosure are not limited to the foregoing, and other unmentioned effects would be clearly understood by those skilled in the art from the following description.

DETAILED DESCRIPTION

Figure 1:
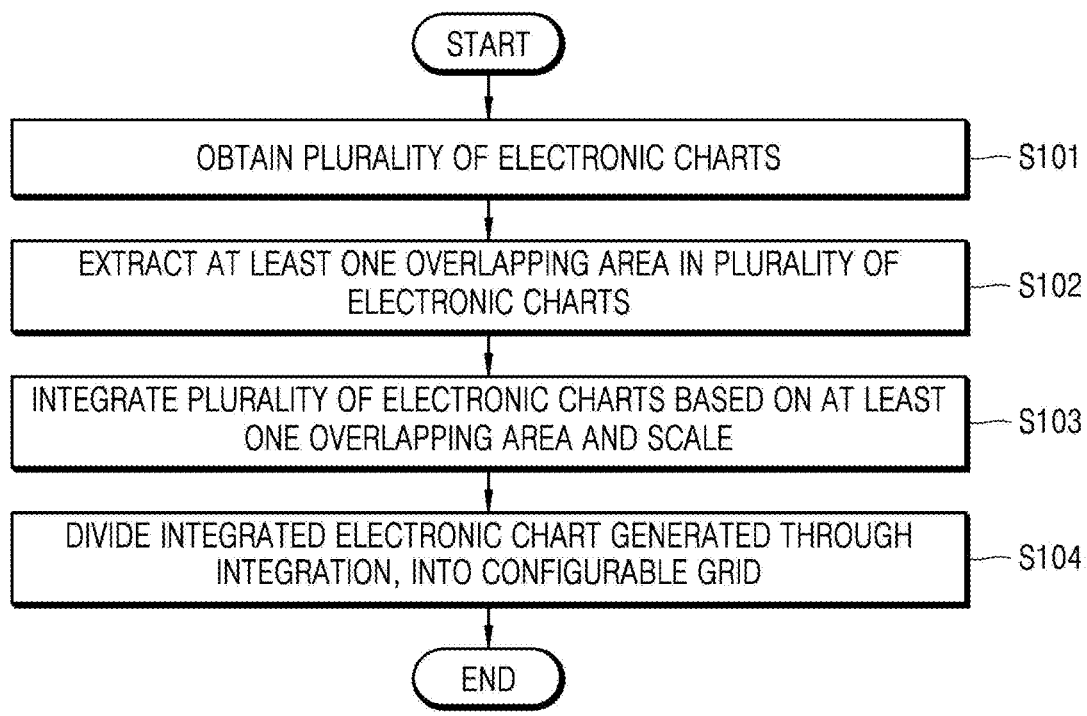
FIG. 1 is a flowchart illustrating an example of a method by which a processor generates an integrated electronic chart by using a quadtree, according to an embodiment.

Hereinafter, various embodiments of the present disclosure will be described with reference to the accompanying drawings. Various embodiments of the present disclosure may be variously modified and may have various embodiments, and particular embodiments are illustrated in the drawings and detailed descriptions related to the embodiments are described. However, this is not intended to limit various embodiments of the present disclosure to particular modes of practice, and it is to be appreciated that all changes, equivalents, and/or substitutes that do not depart from the spirit and technical scope of various embodiments of the present disclosure are encompassed in the present disclosure. With regard to the description of the drawings, similar reference numerals are used to refer to similar elements.

As used in various embodiments of the present disclosure, the expressions "include", "may include", and other conjugates refer to the existence of a corresponding disclosed function, operation, or constituent element, and do not limit one or more additional functions, operations, or constituent elements. In addition, as used in various embodiments of the present disclosure, the terms "include", "have", and other conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

As used in various embodiments of the present disclosure, expressions such as "or" include any and all combinations of the listed words. For example, "A or B" may include A, may include B, or may include both A and B.

As used in various embodiments of the present disclosure, expressions such as "first" or "second" may modify various components of various embodiments, but do not limit the components. For example, the expressions do not limit the order and/or importance of the components. The expressions may be used to distinguish one component from another. For example, a first user device and a second user device are all user devices, and indicate different user devices. For example, a first element may be referred to as a second element, and a second element may be referred to as a first element in a similar manner, without departing from the scope of various embodiments of the present disclosure.

As used in embodiments of the present disclosure, terms such as "module", "unit", "part", etc., denote a unit of a component that performs at least one function or operation, and may be implemented as hardware or software or a combination of hardware and software. In addition, a plurality of "modules", "units", "parts", etc. may be integrated into at least one module or chip to be implemented as at least one processor, except for cases in which each of them needs to be implemented as separate particular hardware.

The terms used in various embodiments of the present disclosure are used only to describe a particular embodiment, and are not intended to limit the various embodiments of the present disclosure. Singular forms are intended to include plural forms as well, unless the context clearly indicates otherwise.

Unless otherwise defined, all terms, including technical and scientific terms, used herein have the same meaning as commonly understood by those of skill in the art to which the present disclosure pertains based on an understanding of the present disclosure.

Terms, such as those defined in commonly used dictionaries, are to be interpreted as having a meaning that is consistent with their meaning in the context of the relevant art and various embodiments of the present disclosure, and are not to be interpreted in an idealized or overly formal sense unless expressly so defined herein.

Hereinafter, embodiments of the present disclosure will be described in more detail with reference to the accompanying drawings. In addition, operations according to an embodiment of the present disclosure to be described below may be performed by a processor 14 of FIG. 16. The processor 14 of FIG. 16 will be described in detail below with reference to FIG. 16.

FIG. 1 is a flowchart illustrating an example of a method by which a processor generates an integrated electronic chart, according to an embodiment.

In operation S101, the processor 14 obtains a plurality of electronic charts. According to an embodiment of the present disclosure, the plurality of electronic charts, which are used in an electronic chart display and information system (ECDIS), are charts that may provide navigation information and may be charts that include information about objects.

In operation S102, the processor 14 extracts at least one overlapping area in the plurality of electronic charts.

In operation S103, the processor 14 integrates the plurality of electronic charts based on the at least one overlapping area and a scale of each of the plurality of electronic charts. For example, the processor 14 may integrate the electronic chart with the largest scale among the plurality of electronic charts having the overlapping areas, as the overlapping area of the integrated electronic chart. In other words, the processor 14 may apply an overlapping area from an electronic chart with the largest scale among the plurality of electronic charts to a corresponding overlapping area of the at least one overlapping area. In addition, in an embodiment, the overlapping area may be determined based on the coordinate values (e.g., position values for a latitude or longitude) of each of the plurality of electronic charts, or the coordinate values of a coverage area. For example, the overlapping area may have common coordinate values from at least two of the plurality of electronic charts.

In operation S104, the processor 14 divides an integrated electronic chart generated through a plurality of integrations, into a configurable grid. According to an embodiment, the configurable grid may be a uniform or non-uniform grid, and further, a method of generating the grid cell, the shape and size of grid cells constituting the grid, and information included in the grid cell may be freely selected.

In a specific embodiment, the processor 14 may divide the integrated electronic chart, generated by an integration, into a grid using a quadtree, depending on the presence or absence of an object. In more detail, based on a comparison between the size of the divided grid and a preset minimum grid size, the processor 14 redivides the divided grid by using a quadtree according to the presence or absence of an object included in the divided grid or the presence or absence of an object interpolated based on a division result.

Meanwhile, objects included in an electronic chart may not be all distributed uniformly but may be concentrated in one area. When quadrangular unit routes are generating uniformly without considering such non-uniform distribution, an area containing a large amount of object information cannot be represented with sufficient resolution, and an area containing little object information is represented with insufficient resolution, making data processing inefficient. Thus, a quadtree division method may be used as a method for overcoming the non-uniform distribution of objects in an electronic chart.

For example, the processor 14 may divide an integrated electronic chart into a grid such that an area containing object information in the integrated electronic chart becomes a quadtree, and repeatedly divide the grid of the integrated electronic chart using a quadtree until a resulting grid contains preset object information. For example, in operation S103, the processor 14 may repeatedly perform redivision until a preset minimum grid size is reached. When a grid to be redivided is smaller than or equal to the minimum grid size, the processor 14 may no longer perform redivision.

As another example, based on a comparison between the size of the redivided grid and the preset minimum grid size, the processor 14 may repeatedly perform redivision according to the presence or absence of an object included in the redivided grid or the presence or absence of an object interpolated based on a redivision result. For example, the processor 14 may redivide the previously redivided grid until the preset minimum grid size is reached. Here, the preset minimum grid size may vary depending on the type of an object included in the redivided grid. For example, the type of an object may be land, island, fish farm, anchoring area, or the like, and the minimum grid sizes of land, island, fish farm, and anchoring area may be set to be equal to or different from each other. The preset minimum grid size may be input by a user, or may be arbitrarily determined the processor 14.

Meanwhile, the processor 14 may perform object interpolation based on a plurality of points regarding objects included in the integrated electronic chart, and edges connecting the plurality of points to each other. Objects included in the integrated electronic chart may be indicated as a plurality of points. The processor 14 may connect the plurality of points to each other to generate one or more edges. In addition, the processor 14 may select a grid that does not include a point but includes an edge generated by connecting a plurality of points, and may generate additional object information in the selected grid. A method of performing object interpolation by using a plurality of points and edges will be described below with reference to FIG. 8.

Hereinafter, an example of a method by which the processor 14 integrates a plurality of electronic charts will be described with reference to FIG. 2.

Figure 2:
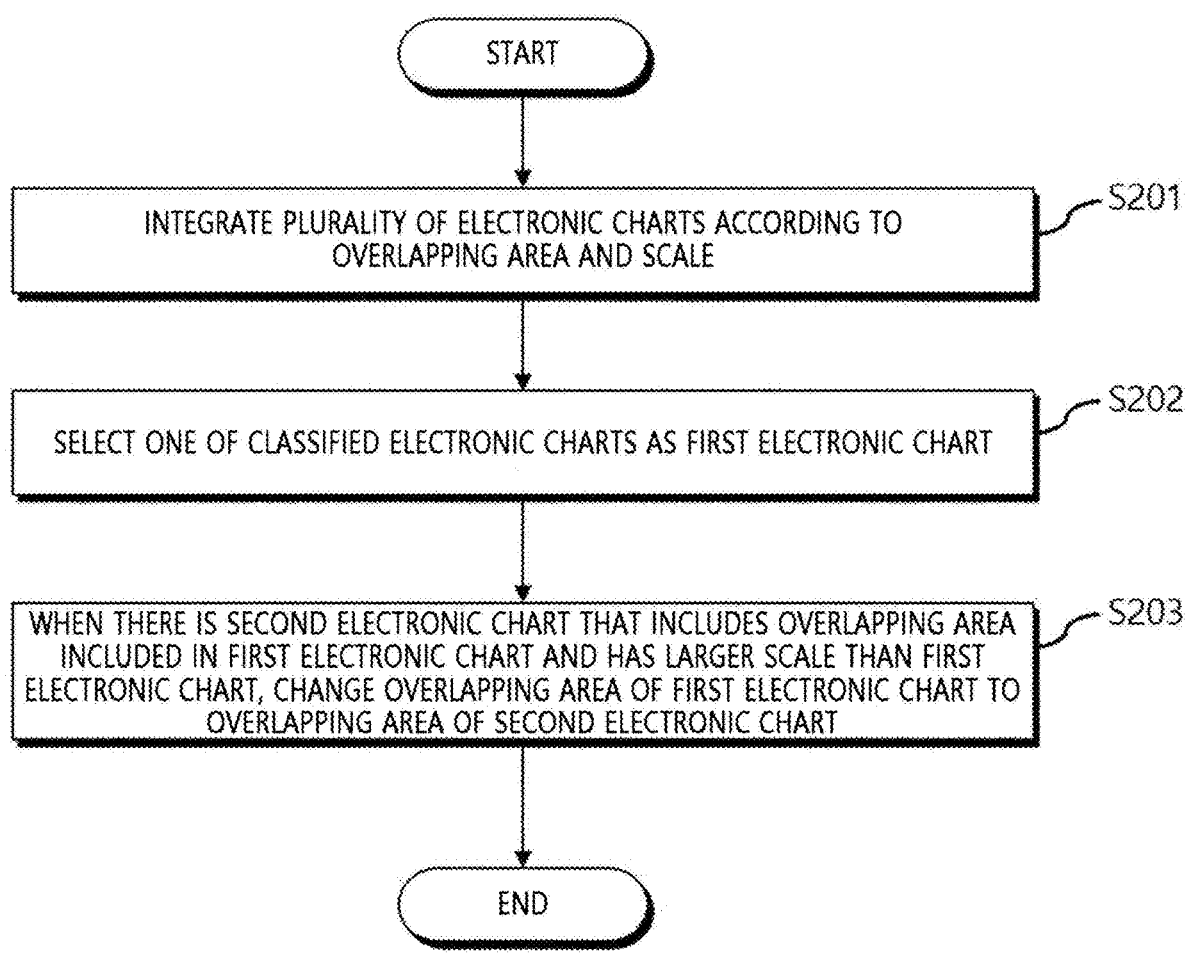
FIG. 2 is a flowchart for describing an example of a method by which a processor integrates a plurality of electronic charts according to an overlapping area and a scale, according to an embodiment.

FIG. 2 is a flowchart for describing an example of a method by which a processor integrates a plurality of electronic charts according to an overlapping area and a scale, according to an embodiment. Meanwhile, operations S201 to S203 of FIG. 2 may be a detailed example of operations S101 to S103 of FIG. 1. In other words, after completing operations S201 to S203 of FIG. 2, operation S104 of FIG. 1 may be performed.

In operation S201, the processor 14 may integrate a plurality of electronic charts according to an overlapping area and a scale. The plurality of electronic charts used to generate an integrated electronic chart may include overlapping areas. The overlapping areas may vary for each of the plurality of electronic charts. For example, while a first electronic chart and a second electronic chart may have area A as an overlapping area, the second electronic chart and a third electronic chart may have area B as an overlapping area. The processor 14 may classify the plurality of electronic charts based on the overlapping areas, to select an electronic chart to be included in an overlapping area of the integrated electronic chart.

In operation S202, the processor 14 selects one of the classified electronic charts as a first electronic chart. For example, the processor 14 may arbitrarily select one of the classified electronic charts as the first electronic chart. As another example, the processor 14 may select an electronic chart having the largest scale from among the classified electronic charts, as the first electronic chart. In this case, the processor 14 may omit operation S203, which will be described below, and include the selected first electronic chart in the integrated electronic chart.

In operation S203, when there is a second electronic chart that includes the overlapping area included in the first electronic chart and has a larger scale than the first electronic chart, the processor 14 may change the overlapping area of the first electronic chart to the overlapping area of the second electronic chart. When there are a plurality of electronic charts including overlapping areas, the processor 14 may select an electronic chart with the largest scale as an electronic chart to be included in the integrated electronic chart.

Meanwhile, as another example of a method of integrating a plurality of electronic charts, in operation S201, the processor 14 may classify a plurality of electronic charts having different scale levels based on overlapping areas, and extract the types and coordinates of objects within the overlapping areas from the classified electronic charts. In operation S202, the processor 14 may select one of the classified electronic charts as the first electronic chart. In operation S203, when there is a second electronic chart that contains the same object type and coordinates as the first electronic chart and has a larger scale than the first electronic chart, the processor 14 may change the overlapping area of the first electronic chart to the overlapping area of the second electronic chart.

For example, the processor 14 may extract the types and coordinates of objects in the overlapping areas from the classified electronic charts, and when an electronic chart containing the same object type and coordinates as a current electronic chart and having a larger scale than the current electronic chart, is selected as a next electronic chart, the processor 14 may change the overlapping area of the current electronic chart to the overlapping area of the next electronic chart.

Here, different minimum node sizes may be applied to the respective extracted objects by using the types and coordinates of the objects, and a division operation may be performed by using a quadtree. Because each object has a different degree or direction of influence on driving of a ship, division is performed by using the types of objects considered when generating an integrated electronic chart.

In other words, the processor 14 may perform electronic chart extraction according to scale by considering only the overlapping areas based on overlapping of areas within a map, but may also additionally consider objects included in the overlapping areas. When there is an electronic chart that contains an object and an electronic chart that does not contain an object, the processor 14 may extract the electronic chart that contains the object to construct an integrated electronic chart.

Here, objects unnecessary for driving of the ship may be filtered to remove their information from the electronic chart. This is to prevent memory from being wasted on irrelevant objects in setting of a route of the ship in the integrated electronic chart.

However, examples of methods of integrating a plurality of electronic charts are not limited to the above.

Hereinafter, an integration process of an electronic chart integration unit according to an embodiment of the present disclosure will be described with reference to FIG. 3.

Figure 3:
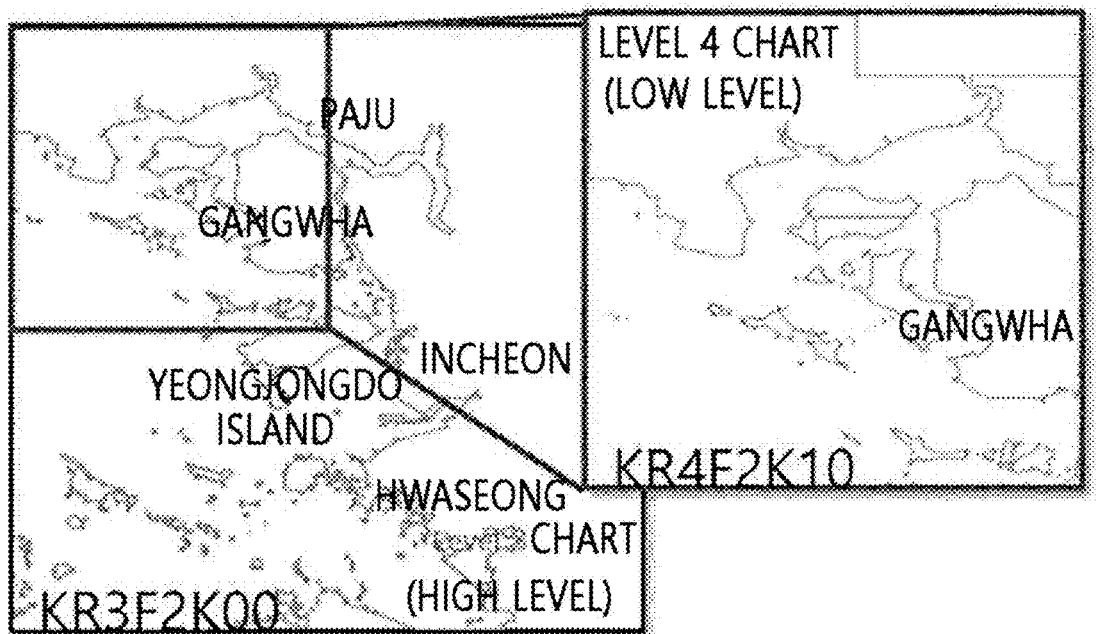
FIG. 3 is a diagram for describing an example of a process in which a processor integrates electronic charts, according to an embodiment.

As illustrated in FIG. 3, two electronic charts KR3F2K00 and KR4F2K10 for a Ganghwa area may be stored in an electronic chart database (DB) 130. The first two letters in the electronic chart number are a code of the country of production of the electronic chart, and the third letter is a code for each navigation purpose, also referred to as a level number, and refers to the scale level of the chart. The remaining letters of the electronic chart may be a cell code determined by the country.

In other words, KR3F2K00 is an electronic chart with a scale level of 3, KR4F2K10 is an electronic chart with a scale level of 4, KR3F2K00 may be a high-level electronic chart, and KR4F2K10 may be a low-level electronic chart. KR4F2K10 expresses the Ganghwa area in more detail by enlarging it at the lower level, and thus may contain more detailed information about an overlapping area, that is, the Ganghwa area, than KR3F2K00.

Thus, when there is an electronic chart with a scale level of 3 and an electronic chart with a scale level of 4 with respect to the Ganghwa area, which is the overlapping area, an integrated electronic chart containing more detailed information may be obtained by generating an integrated electronic chart by using the electronic chart with a scale level of 4 for the Ganghwa area, which is the overlapping area.

Hereinafter, an integration process of an electronic chart integration unit according to another embodiment of the present disclosure will be described with reference to FIG. 4.

Figure 4:
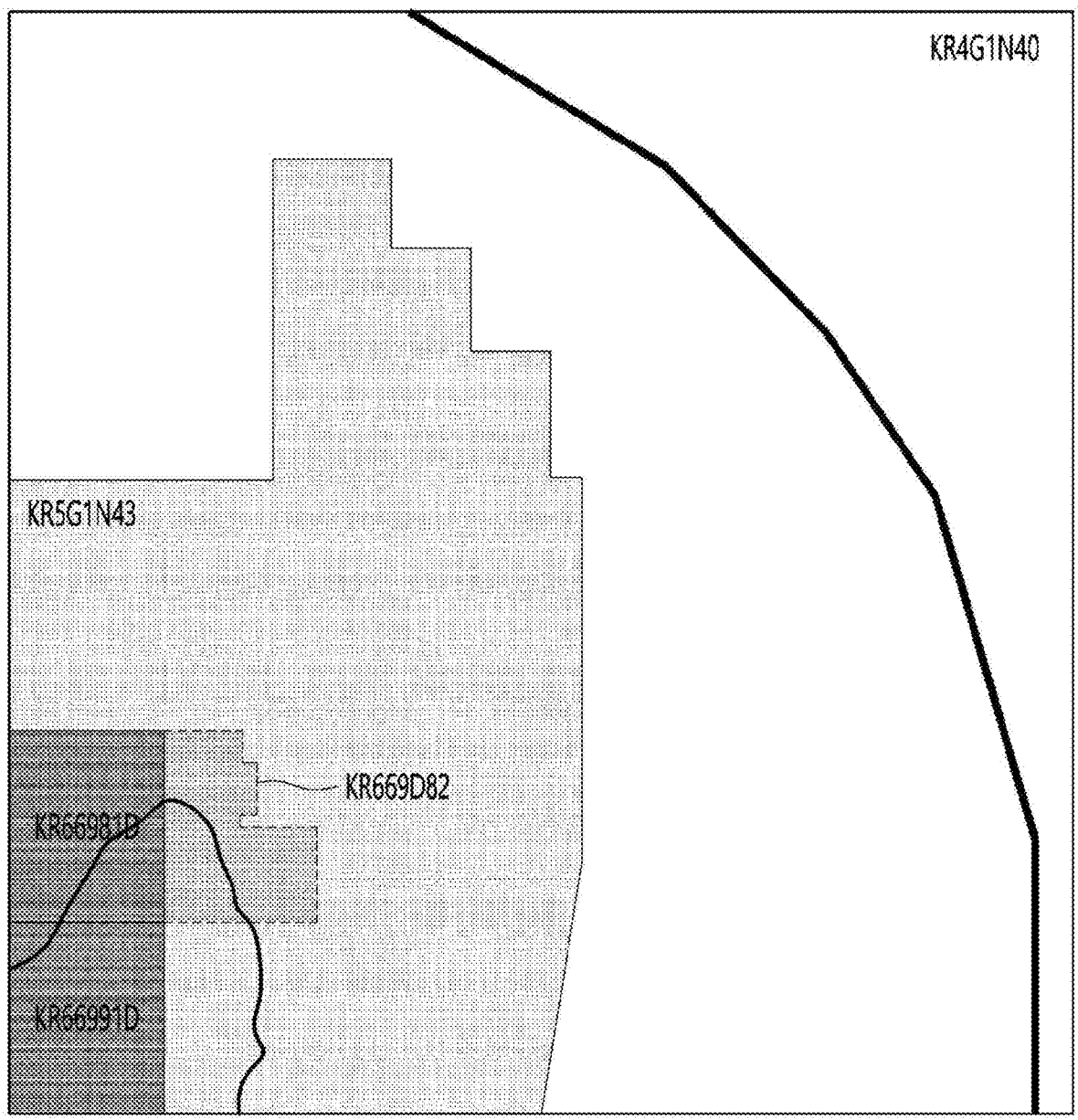
FIG. 4 is a diagram for describing another example of a process in which a processor integrates electronic charts, according to an embodiment.

Referring to FIG. 4, electronic charts KR4G1N40, KR5G1N43, and KR669D82 according to an embodiment of the present disclosure has various types depending on their purposes and areas, may contain various types of data such as water depth, tide, or navigational hazard, and may have different scales. An area marked with a dotted line corresponds to an overlapping area between the level-4 electronic chart KR4G1N40, the level-5 electronic chart KR5G1N43, and the level-6 electronic chart KR669D82.

In order to generate an integrated electronic chart for the overlapping area, the processor 14 may use only the area belonging to the level-6 electronic chart KR669D82 with the largest scale, without using the level-4 electronic chart KR4G1N40 and the level-5 electronic chart KR5G1N43. In other words, the processor 14 may generate an integrated electronic chart based on data of the electronic chart with the largest scale for an overlapping area between a plurality of electronic charts.

The processor 14 according to an embodiment of the present disclosure may classify a plurality of electronic charts with different scales based on overlapping areas, then perform preprocessing to replace an overlapping area according to a scale level, combine each area of the plurality of electronic charts, and generate an integrated electronic chart. In other words, the processor 14 may generate an integrated electronic chart with a high resolution by combining electronic charts with the largest scale for an overlapping area among the plurality of electronic charts.

The processor 14 may generate an integrated electronic chart containing all information related to driving of the ship by integrating electronic charts containing different objects for respective purposes. Here, the electronic charts have different scales, and the processor 14 may perform integration according to the scale level of each electronic chart. The scale level may include a scale value and a scale comparison with another electronic chart.

For example, an integrated electronic chart may be generated by combining electronic charts with large scales with respect to an overlapping area between a plurality of electronic charts with different scales. An integrated electronic chart may be generated by preprocessing the scales of a plurality of electronic charts with different scales to be equal to each other, and then combining the electronic charts with each other.

As another example, an integrated electronic chart with a high resolution may be generated by extract an electronic chart with the largest scale from electronic charts containing one area among a plurality of electronic charts with different scales, extracting an electronic chart with the largest scale from electronic charts that include another area, and combining the electronic charts with the largest scale for the entire area.

Meanwhile, the processor 14 may, when electronic chart integration for all overlapping areas is completed, store the integrated electronic chart, and when electronic chart integration for all overlapping areas is not completed, perform operation S201 to S203 described above again for the next overlapping area. Meanwhile, the processor 14 may control the navigation of a ship based on the completed electronic chart integration. The control may include adjusting the ship's course, speed, and navigation parameters to avoid obstacles, optimize the route, or maintain safe passage within predefined boundaries by sending a command to relevant devices, such as autopilot system or engine control unit, of the ship.

Hereinafter, another example of a method by which the processor 14 integrates a plurality of electronic charts will be described with reference to FIG. 5.

Figure 5:
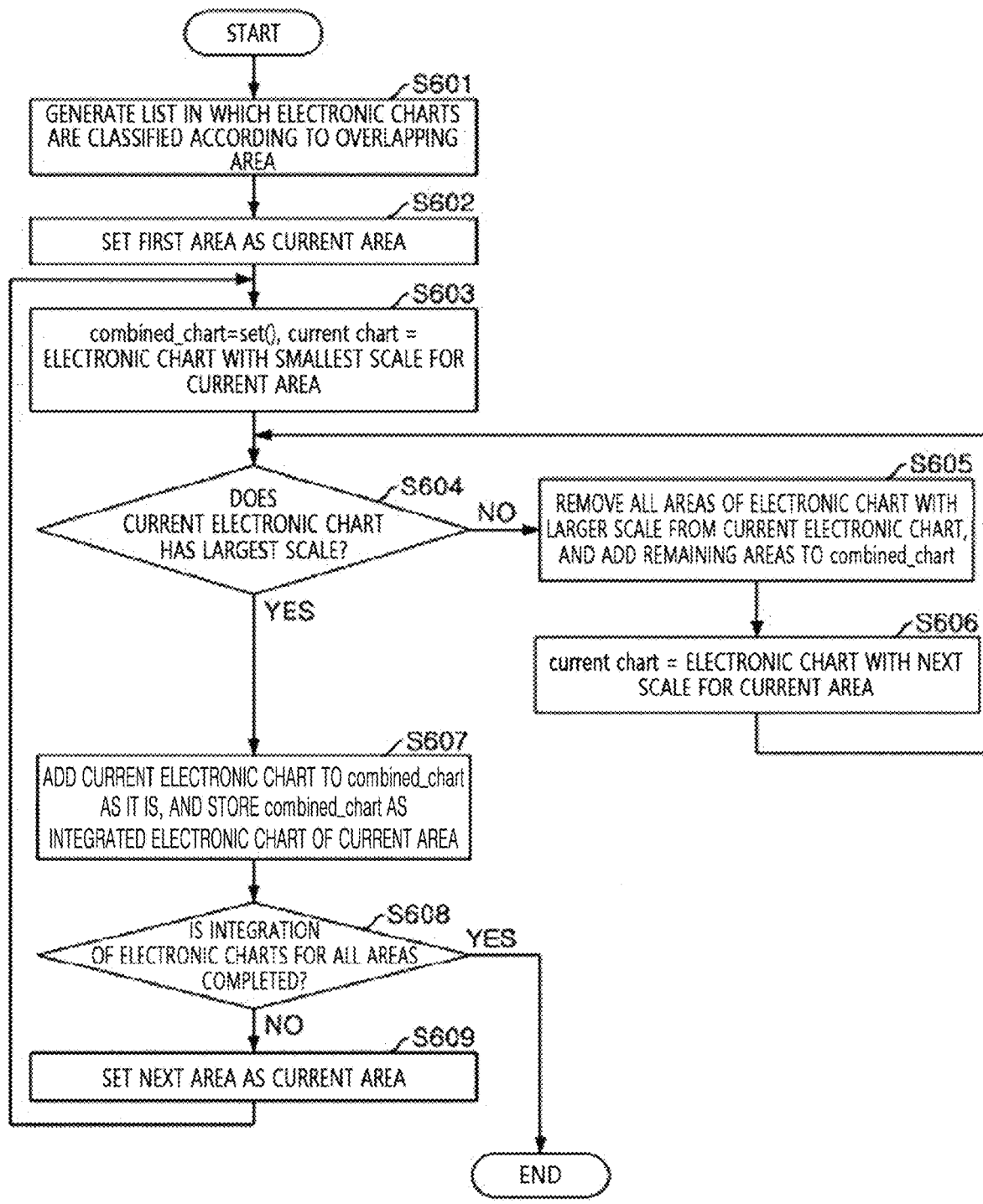
FIG. 5 is a flowchart for describing another example of a method by which a processor integrates a plurality of electronic charts according to an overlapping area and a scale, according to an embodiment.

FIG. 5 is a flowchart for describing another example of a method by which a processor integrates a plurality of electronic charts according to an overlapping area and a scale, according to an embodiment.

In operation S601, the processor 14 generates a list in which electronic charts are classified according to an overlapping area, for a plurality of electronic charts with different scales.

For example, the processor 14 may classify electronic charts based on one or more of chart numbers, chart names, scales, and code numbers of the electronic charts, and generate a list by sequentially sorting the classified electronic charts. As described above, the chart number of the electronic chart contains electronic chart information, and thus, the processor 14 may perform classification by using the chart number.

In operation S602, the processor 14 sets a first area as a current area in the electronic chart list classified according to the overlapping area. The first area is a particular area included in the plurality of electronic charts, and the plurality of electronic charts may consist of the first area, a second area, . . . , and an n-th area.

In operation S603, the processor 14 may set an integrated electronic chart (combined_chart) to a set (set( )) of the electronic charts included in the classified electronic chart list, which is represented as combined_chart=set( ) in FIG. 5, and set the current chart to be the electronic chart with the smallest scale for the current area. This is to configure combined_chart by extracting electronic charts including an overlapping area according to the scale levels of the electronic charts included in the classified electronic chart list, and to determine whether to extract by determining the scale level of the current electronic chart.

In operation S604, the processor 14 may determine whether the current electronic chart has the largest scale for the first area, which is the current area. When the current electronic chart is the largest scale (YES in S604), in operation S607, the processor 14 may add the current electronic chart to combined_chart as it is, and store combined_chart as an integrated electronic chart of the current area. In other words, combined_chart may be the current electronic chart.

Alternatively, when the current electronic chart does not have the largest scale (NO in S604) for the first area, which is the current area, in operation S605, the processor 14 may remove all areas of an electronic chart with a larger scale from the current electronic chart, and add the remaining areas to combined_chart. In other words, among the areas included in the current electronic chart, an area also included in an electronic chart with a larger scale is removed from the current electronic chart such that the area may be extracted from the electronic chart with a larger scale and used, and only the non-overlapping areas are used to configure the integrated electronic chart.

In operation S606, the processor 14 may change current chart to an electronic chart with a next scale for the current area. In addition, the processor 14 may repeat electronic chart extraction until the current electronic chart has the largest scale.

After operation S607, in operation S608, the processor 14 may determine whether integration of electronic charts for all areas has been completed. When the electronic charts for all areas have been integrated (YES in S608), the processor 14 may terminate the electronic chart integration process. In other words, the processor 14 may set area n as the current area, and when storage of the integrated electronic chart is completed, determine that generation of the integrated electronic chart has been completed, and terminate the process.

When there is an m-th area for which the integration process has not yet been performed (NO in S608), in operation S609, the processor 14 may set the m-th area, which is the next area, as the current area, and repeat operations S603 to S608.

Through the above-described process, an integrated electronic chart may be generated by integrating electronic charts containing the most detailed information for all areas included in the plurality of electronic charts.

Hereinafter, an example in which the processor 14 integrates electronic charts by using a quadtree will be described with reference to FIGS. 6A and 6B.

Figure 6A:
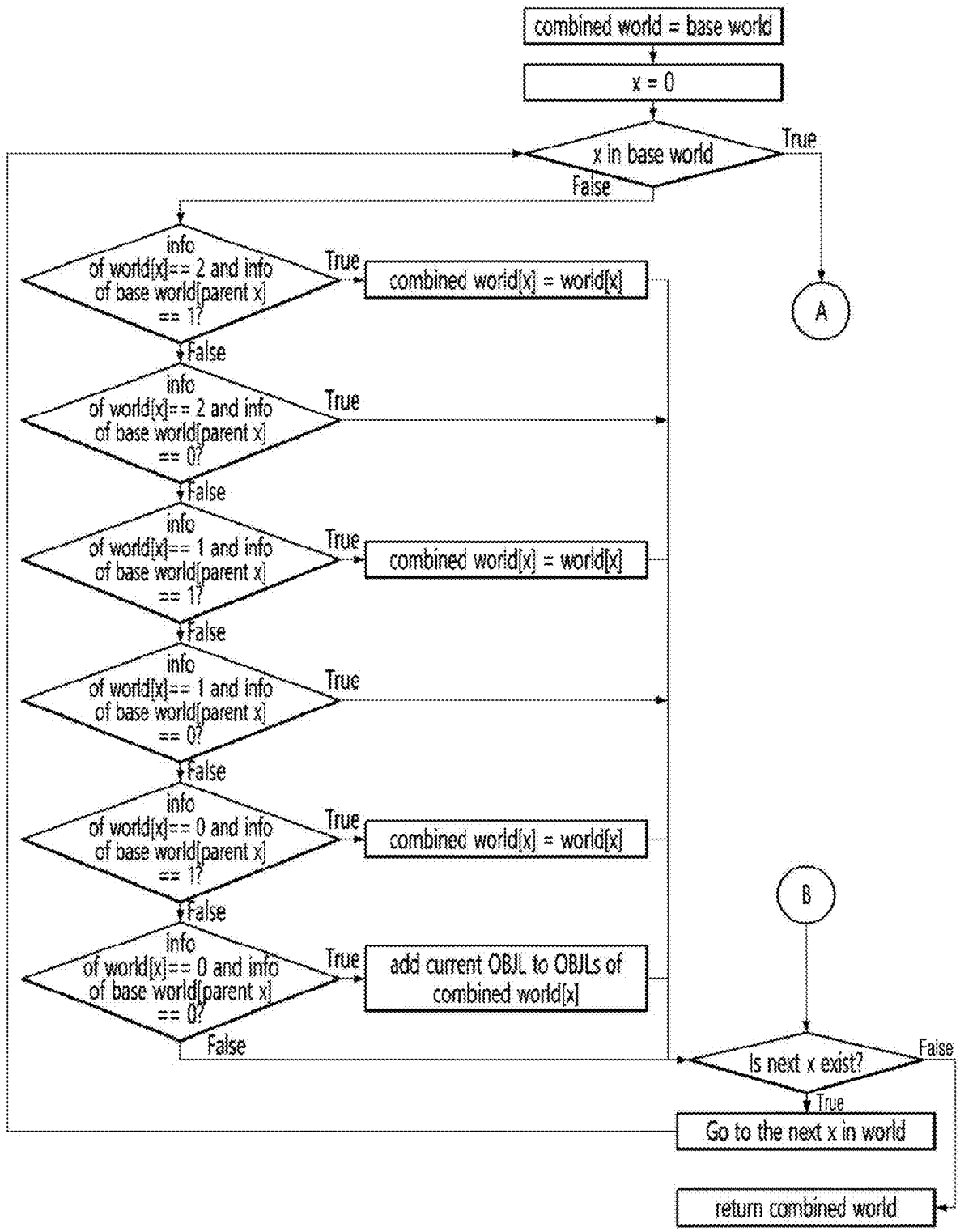
FIGS. 6A-6B are flowcharts for describing an example of a process in which a processor integrates electronic charts by using a quadtree for each object, according to an embodiment.
Figure 6B:
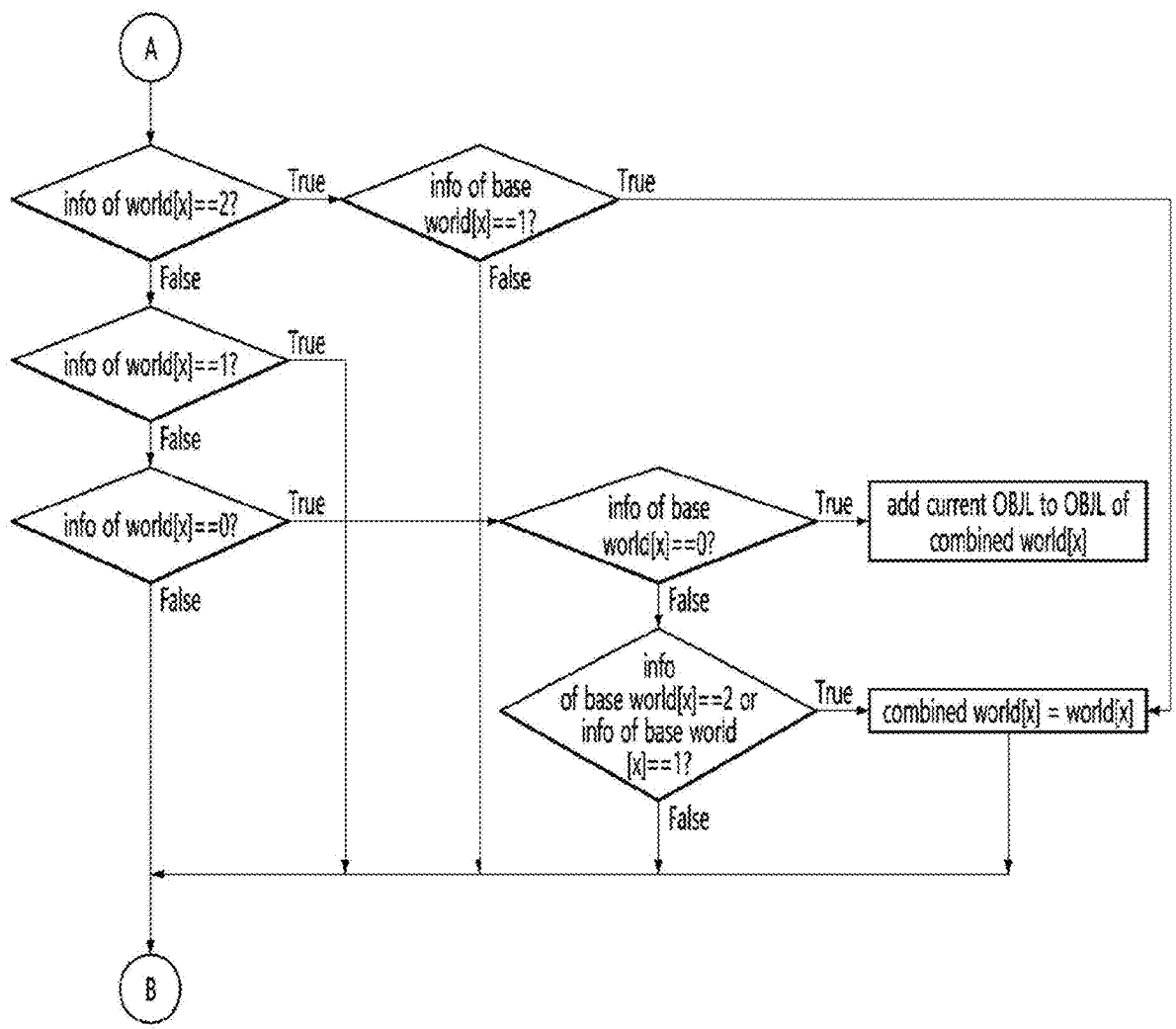

FIGS. 6A and 6B are flowcharts for describing an example of a process in which a processor integrates electronic charts by using a quadtree for each object, according to an embodiment.

FIGS. 6A-6B summarize an algorithm for generating a final quadtree-based integrated electronic chart for all objects by integrating quadtree-based integrated electronic charts for each object, and it is assumed that x is a unique number assigned to a configurable grid, combined world is a final quadtree-based integrated electronic chart, base world is an electronic chart previously integrated into combined world, and world is an electronic chart to be merged into combined world. base world and world are results of division using a quadtree according to selected objects, and may be integrated electronic charts based on a quadtree for each object.

In addition, world[x] denotes a grid with x as a unique number in world, combined world[x] denotes a grid with x as a unique number in combined world, and base world[x] denotes a grid with x as a unique number in base world. Grids having the same size in the same area have the same unique number in base world and world.

base world and world are quadtree-based integrated electronic charts for each object divided by using quadtrees according to each selected object, and may have different minimum node sizes when objects are different from each other. Thus, when base world is divided into grids having a parent grid size and world is divided into grids having a child grid size, for the same area on the electronic chart, world[x] that exists in world may not exist in base world. In other words, there may be no base world[x].

Referring to FIGS. 6A-6B, before integrating quadtree-based integrated electronic charts for each object, various objects may be placed in descending order of minimum node size, and first, integration may be performed by designating the object with the largest minimum node size as base world ("combined world=base world"), and sequentially designating objects with next minimum node sizes as world.

After initialization of "x=0", it may be identified whether the grid with a unique number x is in base world ("x in base world?").

When the grid with the unique number x (base world[x]) is not in base world (x in base world?—"False"), it means that the grid sizes are different because the number of divisions of base world is different in an electronic chart area corresponding to grid x of world (world[x]). That is, the grid of base world has the size of the parent grid, and the grid of world has the size of the child grid. Hereinafter, x having the size of the child grid is denoted as "x", and the grid having the size of the parent grid of the child grid is denoted as "parent x".

Here, when an attribute (info) of world[x] is 2 and an attribute (info) of base world[parent x] is 1 ("info of world[x]==2 and info of base world[parent x]==1?"—"True"), in other words, when world[x] is a grid that includes a child grid, and base world[x] is a grid through which a host ship may pass, combined world[x] may be changed to the grid of world[x] ("combined world[x]=world[x]").

Alternatively, when an attribute (info) of world[x] is 2 and an attribute (info) of base world[parent x] is 0 ("info of world[x]==2 and info of base world[parent x]==0?"—"True"), in other words, when world[x] is a grid that includes a child grid, and base world[x] is a grid through which a host ship cannot pass, combined world[x] may be maintained as base world[x] without changing it to the grid of world[x].

That is, because base world[x] is a grid that may be passed through and has no or few objects that will affect a movement of the ship, and world[x] is a parent grid that necessarily contains object information that will affect the movement of the ship, world[x] replaces the electronic chart of the corresponding area. When base world[x] is a grid that cannot be passed through, even though the area in another integrated electronic chart for each object may be passed through, it cannot be passed through due to object information of base world[x], thus, there is no need to update the electronic chart of the area, and thus the electronic chart of the base world[x] is maintained without replacement.

In an embodiment, when the attribute (info) of world[x] is 1 and the attribute (info) of base world[parent x] is 1 ("info of world[x]==1 and info of base world[parent x]==1?"—"True"), in other words, when world[x] is a child grid rather than a parent grid and is a grid through which the host ship may pass, and base world[x] is a grid through which the host ship may pass, combined world[x] may be changed to the grid of world[x] ("combined world[x]=world[x]").

Alternatively, when an attribute (info) of world[x] is 1 and an attribute (info) of base world[parent x] is 0 ("info of world[x]==1 and info of base world[parent x]==0?"—"True"), in other words, when world[x] is a child grid rather than a parent grid and is a grid through which the host ship may pass, and base world[x] is a grid through which the host ship cannot pass, combined world[x] may be maintained as base world[x] without changing it to the grid of world[x].

In an embodiment, when the attribute (info) of world[x] is 0 and the attribute (info) of base world[parent x] is 1 ("info of world[x]==0 and info of base world[parent x]==1?"—"True"), in other words, when world[x] is a child grid rather than a parent grid and is a grid through which the host ship cannot pass, and base world[x] is a grid through which the host ship may pass, combined world[x] may be changed to the grid of world[x] ("combined world[x]=world[x]"). The electronic chart is changed as the passable area becomes an impassable area.

Alternatively, when the attribute (info) of world[x] is 0 and the attribute (info) of base world[parent x] is 0 ("info of world[x]==0 and info of base world[parent x]==0?"—"True"), in other words, when world[x] is a child grid rather than a parent grid and is a grid through which the host ship cannot pass, and base world[x] is a grid through which the host ship may pass, current object information (current OBJL) of world[x] may be added to object information of combined world[x] ("add current OBJL to OBJLs of combined world[x]"). This is to map the type and coordinates of a previously extracted object to base world[x].

When the grid with the unique number x (base world[x]) is in base world ("x in base world?"—"True"), it means that the grid sizes are equal to each other because the number of divisions of base world is the same in an electronic chart area corresponding to grid x of world (world[x]).

Referring to FIG. 6B, when the attribute (info) of world [x] is 2 ("info of world[x]==2?"—"True"), and the attribute (info) of base world[parent x] is 1 ("info of base world[x] ==1?"—"True"), in other words, when world[x] is a grid that includes a child grid, and base world[x] is a grid having the same size as world[x] through which the host ship may pass, combined world[x] may be changed to the grid of world[x] ("combined world[x]=world[x]").

Alternatively, when the attribute (info) of world[x] is 2 ("info of world[x]==2?"—"True"), and the attribute (info) of base world[parent x] is 0 ("info of base world[x]==1?"—"False"), in other words, when world[x] is a grid that includes a child grid, and base world[x] is a grid having the same size as world[x] through which the host ship cannot pass, combined world[x] may be maintained as base world [x] without changing it to the grid of world[x].

In an embodiment, when the attribute (info) of world[x] is 1 ("info of world[x]==1?"—"True"), regardless of whether the attribute (info) of base world[x] is 1 or 0, combined world[x] may be maintained as base world[x] without changing it to the grid of world[x]. In other words, when world[x] is a grid through which the host ship may pass, base world[x] may be a grid having the same size as world[x] through which the host ship cannot pass, may be a grid having the same size as world[x] through which the host ship may pass, or may be maintained as base world[x].

In an embodiment, when the attribute (info) of world[x] is 0 ("info of world[x]==0?"—"True"), and the attribute (info) of base world[parent x] is 0 ("info of base world[x]==0?"—"True"), in other words, when world[x] is a grid through which the host ship cannot pass, and base world[x] is a grid having the same size as world[x] through which the host ship cannot pass, current object information (current OBJL) of world[x] may be added to object information of combined world[x] ("add current OBJL to OBJLs of combined world[x]"). This is to map the type and coordinates of a previously extracted object to base world[x].

Alternatively, when the attribute (info) of world[x] is 0 ("info of world[x]==0?"—"True"), and the attribute (info) of base world[parent x] is 2 or 1 ("info of base world[x]==2 or info of base world[x]==1?"—"True"), in other words, when world[x] is a grid through which the host ship cannot pass, and base world[x] is a parent grid having the same size as world[x] or a grid through which the host ship may pass, combined world[x] may be changed to the grid of world[x] ("combined world[x]=world[x]"). This is to update information of base world[x], which includes a passable area, to the chart of world[x], which is an impassable area.

Referring to FIG. 6A, when the above-mentioned process is completed and thus the process of integrating world[x] into combined world[x] is completed, it may be identified whether the next grid x exists ("Is next x exist?"), and when the next grid x exists ("Is next x exist?"—"True"), x may be updated to the unique number of the next grid ("Go to the next x in world"). Thereafter, the above-described process may be repeated.

Alternatively, when the next grid x does not exist ("Is next x exist?"—"False"), the process may return to combined world to complete integration of the quadtree-based integrated electronic charts for each object and generate a final quadtree-based integrated electronic chart ("return combined world").

As described above with reference to FIGS. 1 to 6B, the processor 14 may generate an integrated electronic chart by integrating a plurality of electronic charts. However, examples of integrating a plurality of electronic charts are not limited to the above.

Hereinafter, an example of a method by which the processor 14 divides an integrated electronic chart will be described with reference to FIG. 7. Because a grid cell of a grid may be further divided to form another grid in a repetitive manner, the term grid in the embodiments of the present invention may refer to a grid cell.

Figure 7:
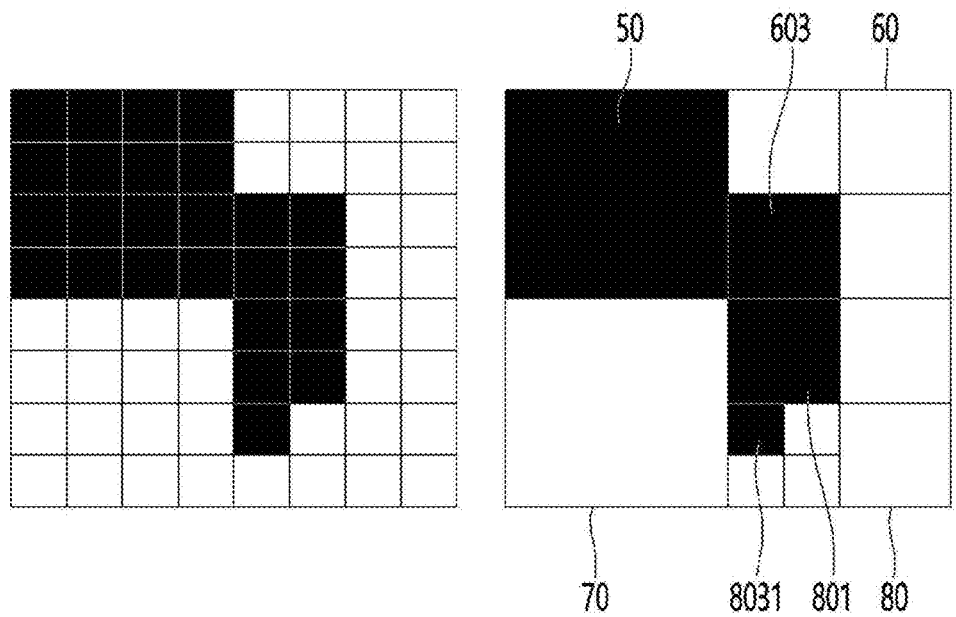
FIG. 7 is a diagram for describing an example of a method by which a processor divides an integrated electronic chart into a grid using a quadtree, according to an embodiment.

FIG. 7 is a diagram for describing an example of a method by which a processor divides an integrated electronic chart into a grid by using a quadtree, according to an embodiment. FIG. 7 may be a diagram for describing operation S102 of FIG. 1.

As illustrated in FIG. 7, when setting a route based on an electronic chart, and dividing the electronic chart into a uniform grid of a predetermined standard, there are differences such as one grid having many objects to be detected and another grid having few objects to be detected. However, because an area with many objects needs to be expressed with the same number of grids and display objects with the same capacity and resolution as an area with few objects, a grid of an area with many objects does not display objects properly, and a grid of an area with few objects unnecessarily wastes memory and resolution.

A quadtree-based electronic chart according to an embodiment of the present disclosure is an electronic chart divided by using a quadtree. A quadtree is a tree structure having only four child nodes, and a grid of an area with many objects may be further subdivided, and a grid of an area with few objects may be coarsely divided to form a non-uniform grid.

For example, the processor 14 may set a minimum number of objects or a minimum grid size of a node, and divide an electronic chart into a non-uniform grid as illustrated in FIG. 7 by repeating division until a preset object or grid size is reached.

As another example, assuming that a minimum number of objects is set to 1 and division is performed until a node contains one object, even when an area with few objects is divided until only one object is contained, the area is divided only until a grid is relatively large in size, and when an area with many objects may be divided until only one object is contained, the area may be divided until a significantly small grid is obtained.

In other words, the number of divisions may be variously adjusted for each of grids included in an integrated electronic chart depending on object information, and even when the same resolution and memory are allocated to each grid, the resolution and memory may be concentrated in areas with many objects, enabling efficient use of computing resources.

As illustrated in FIG. 7, four grid 50, 60, 70, and 80 having a first size exist, and a first grid 50 and a third grid 70 are not divided. As described above, the preset minimum grid size may vary depending on the type of an object included in the grid. In FIG. 7, object information is contained in the first grid 50, but when the minimum grid size according to the type of an object is greater than or equal to the size of the first grid 50, further division may not be performed. In addition, the third grid 70 does not contain object information, and thus may not be further divided.

On the contrary, a second grid 60 and a fourth grid 80 contain object information and thus may form four child grids by using a quadtree. In this case, the second grid 60 and the fourth grid 80 may become parent grids, and each four grids inside them may become child grids. The second grid 60 includes a third child grid 603 as one of four child grids, and the fourth grid 80 includes a first child grid 801 as one of child grids.

When the child grids of the second grid 60 and the fourth grid 80 do not have the preset minimum grid size, redivision may be performed depending on the presence or absence of object information therein. When the third child grid of the fourth grid 80 contains object information, the third child grid may be divided by using a quadtree to form child grids again. A child grid 8031 of the third child grid may be formed. A detailed method will be described below.

Hereinafter, another example of a method by which the processor 14 divides an integrated electronic chart will be described with reference to FIG. 8.

Figure 8:
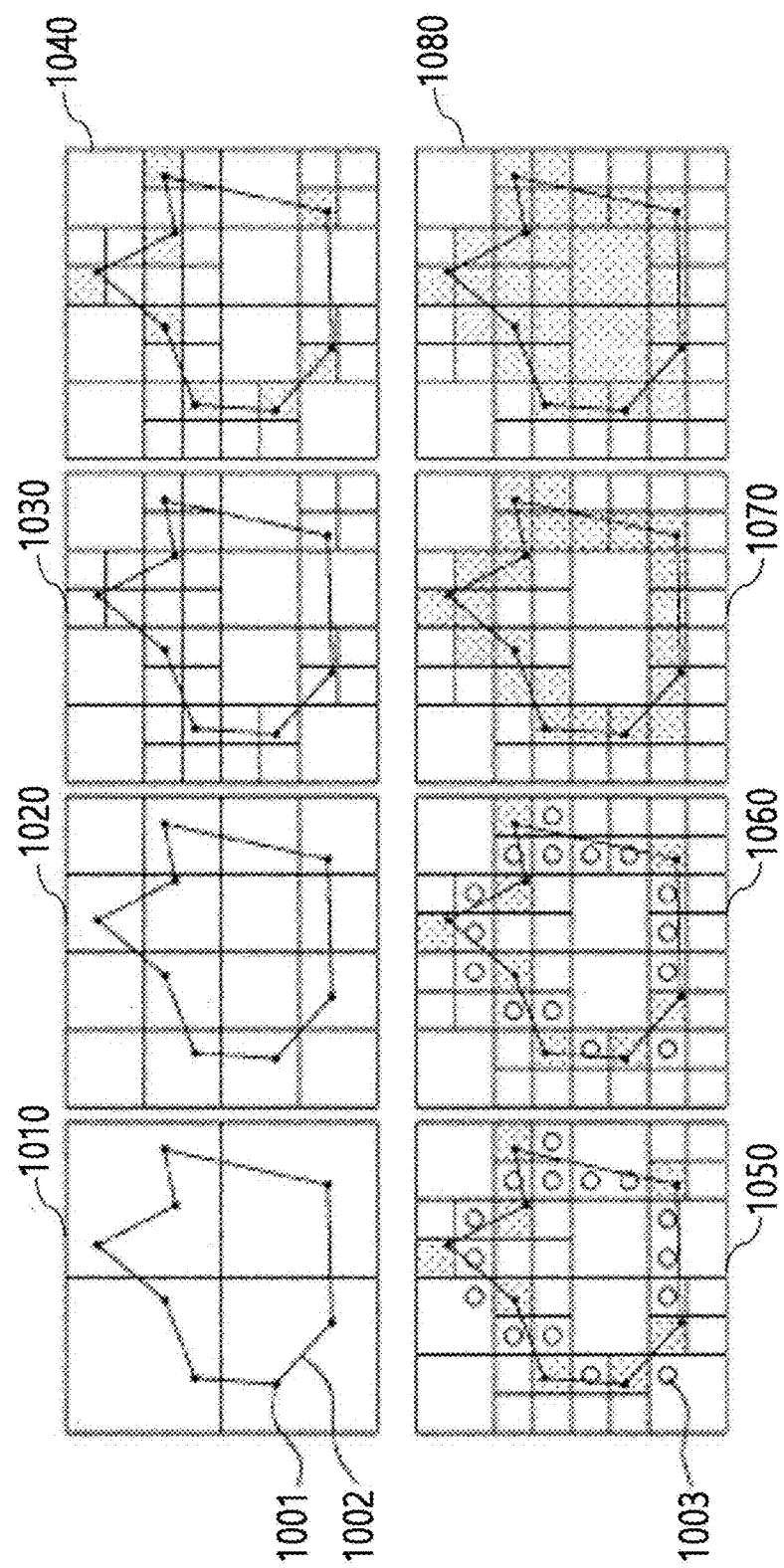
FIG. 8 is a diagram for describing another example of a method by which a processor divides an integrated electronic chart into a grid by using a quadtree, according to an embodiment.

FIG. 8 is a diagram for describing another example of a method by which a processor divides an integrated electronic chart into a grid by using a quadtree, according to an embodiment. FIG. 8 may be a diagram for describing operation S103 of FIG. 1.

Referring to FIG. 8, the processor 14 may express an object as a point 1001 or an edge 1002 and perform grid division by determining a maximum number of divisions. For example, the processor 14 may express an object as the point 1001 in a generated integrated electronic chart, and connect the points 1001 to generate the edge 1002 (see the first integrated electronic chart 1010). According to an embodiment, the integrated electronic chart may be data including the points 1001, and the processor 14 may arbitrarily generate the edge 1002 by connecting the points 1001.

The processor 14 may divide the grid into a grid by using a quadtree depending on the presence or absence of a point 1001 or an edge 1002 (see the second integrated electronic chart 1020). The processor 14 may perform division on a grid containing the point 1001 or the edge 1002 up to the minimum grid size, and stop further division on a grid that does not contain the point 1001 or the edge 1002 (see the third integrated electronic chart 1030). As a result, the processor 14 may generate a primary quadtree-based integrated electronic chart.

The processor 14 fills the grid containing the point 1001 representing an object in the primary quadtree-based integrated electronic chart, with a black block (see the fourth integrated electronic chart 1040). In addition, the processor 14 may perform interpolation between the points 1001 to form a new object 1003 in an area through which the edge 1002 passes, among grids not filled with the black blocks (see the fifth integrated electronic chart 1050). For example, when an edge generated by connecting the points 1001 passes through a grid that is not filled with the black block, the processor 14 may perform interpolation to form a new object 1003 in the corresponding grid.

In addition, when a primarily divided grid is larger than the minimum grid size, the processor 14 may redivide the primarily divided grid by using a quadtree according to the presence or absence of the new object 1003 in the divided grid (see the sixth integrated electronic chart 1060). As a result, the processor 14 may generate a secondary quadtree-based integrated electronic chart.

In addition, the processor 14 may fill the grid containing the new object 1003 other than the point 1001 representing the object in the secondary quadtree-based integrated electronic chart with a black block (see the seventh integrated electronic chart 1070).

In addition, when there is a closed area within the areas filled with the black block, the processor 14 may fill the closed area with a black block (see the eighth integrated electronic chart 1080).

In an embodiment, a route setting unit may determine that the area filled with the black block is a route on which the ship cannot travel due to the presence of the object, and thus set a route with other areas than the area filled with the black block.

Hereinafter, an example of comparing the size of a divided grid with a preset minimum grid size will be described with reference to FIG. 9.

Figure 9:
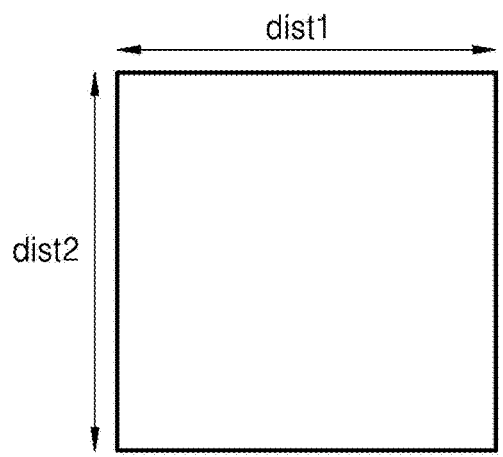
FIG. 9 is a diagram for describing an example in which a processor compares the size of a divided grid with a preset minimum grid size, according to an embodiment.

Referring to FIG. 9, the processor 14 may compare the size of a divided grid with a preset minimum grid size. For example, the processor 14 compares the smaller of a first length dist1 connecting the upper left point to the upper right point of the divided grid and a second length dist2 connecting the upper left to the lower left point of the divided grid, with the preset minimum grid size. Here, the first length dist1 connecting the upper left point to the upper right point of the divided grid or the second length dist2 connecting the upper left point to the lower left point of the divided grid may be calculated using the Haversine formula.

Meanwhile, the processor 14 may store attribute information of a grid included in an integrated electronic chart using information about the grid of the integrated electronic chart and information about an object contained in the grid of the integrated electronic chart. Hereinafter, an example of attribute information of a grid stored by the processor 14 will be described with reference to FIG. 10.

Figure 10:
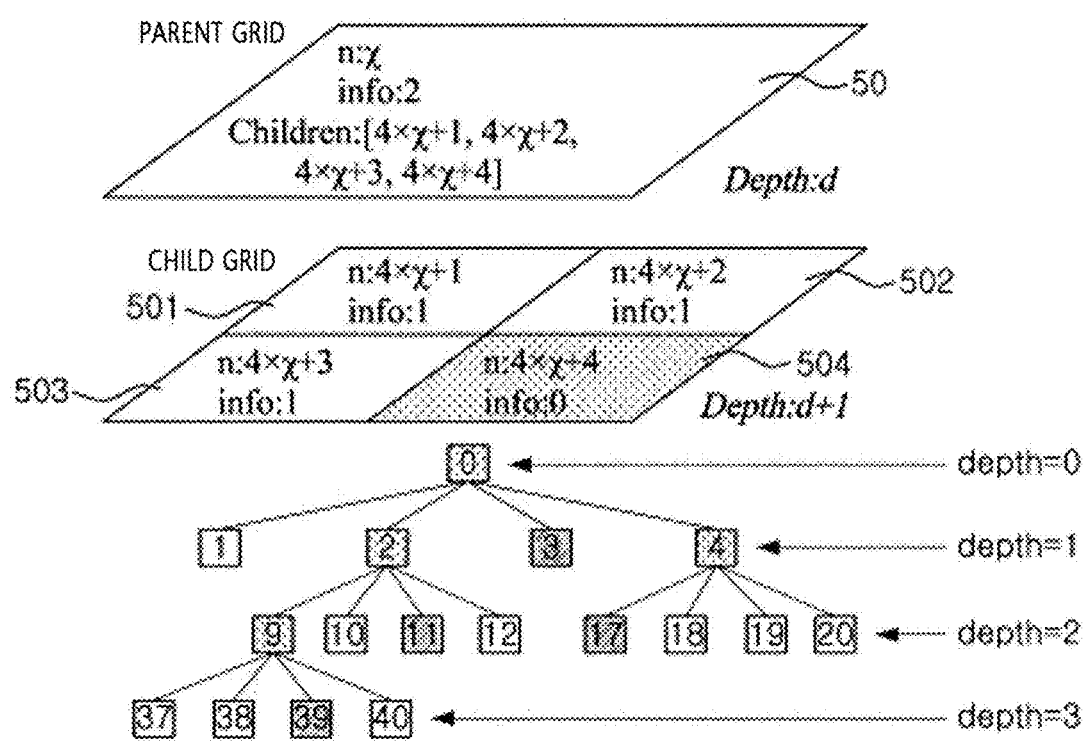
FIG. 10 is a diagram for describing an example of attribute information of a grid included in an integrated electronic chart, according to an embodiment.

FIG. 10 is a diagram for describing an example of attribute information of a grid included in an integrated electronic chart, according to an embodiment.

As illustrated in FIG. 10, a parent grid 50 may contain a unique number (n) assigned to the grid, attribute (info) information, and unique numbers of child grids (children) included in the parent grid 50. Although not illustrated separately, the coordinates of the lower left corner, width, and height of each grid, a route weight depending on the type of an object included in the grid, and the number of divisions (depth) may also be included.

In particular, when the number of divisions (depth) of the parent grid 50 is d, the numbers of divisions (depth) of child grids 501, 502, 503, and 504 are d+1, and thus, the depth increases by 1 for one division.

As illustrated in FIG. 10, when the node numbered 0 with depth=0 forms four child nodes numbered 1, 2, 3, and 4 using a quadtree, the child nodes have depth=1. When the child nodes numbered 1, 2, 3, and 4 form 16 grandchild nodes numbered 5 to 20 using a quadtree, the depth of the grandchild node is 2. When the 16 grandchild nodes form 64 great-grandchild nodes numbered 21 to 68 using a quadtree, the great-grandchild nodes have depth=3.

The depth cannot exceed the maximum number of divisions of a node, and the minimum grid size may be determined according to the maximum number of divisions.

The child nodes, the grandchild nodes, and the great-grandchild nodes are all expressed as child grids 501, 502, 503, and 504, and a grid including the child grids 501, 502, 503, and 504 is defined as the parent grid 50.

Attribute (info) information may have one of 0, 1, and 2, where 2 may represent a grid with child grids, 1 may represent a grid without objects among the child grids such that the host ship may pass therethrough, and 0 may represent a grid among the child grids in which an object is located such that the host ship cannot pass therethrough. When a grid without child grids has an attribute of 1, the grid is a grid through which the host ship may pass, and when a grid without child grids has an attribute of 0, the grid is blocked such that host ships cannot pass therethrough.

In addition, the attribute (info) information may include information about a grid of an integrated electronic chart and information about an object included in a grid of the integrated electronic chart. Information about a grid of an integrated electronic chart may include position information of the grid, size information of the grid, a route setting weight, and the like, as physical information of the grid. Information about an object included in a grid of an integrated electronic chart may include information about the type of the object, the size of the object, the position of the object, and the like.

For example, the processor 14 may store, for a divided grid, an attribute of the grid, and may further store the size and identification number of each grid, the type of an object included in the grid, a minimum grid size and a route setting weight according to the type of an object, and the coordinates of a corner edge.

Meanwhile, the processor 14 may calculate a collision probability of the host ship by using attribute (info) information, and set a navigational route according to the calculated collision probability. For example, by setting a route setting weight for a grid adjacent to a land, a navigational route may be set to avoid the grid adjacent to the land.

Hereinafter, an example of a route setting weight contained in a grid will be described with reference to FIG. 11.

Figure 11:
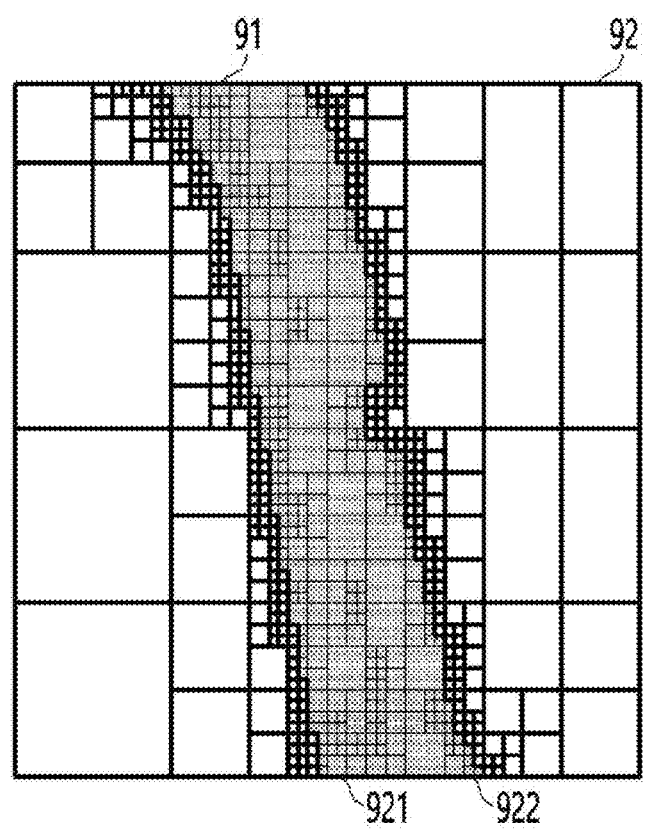
FIG. 11 is a diagram for describing route setting weights according to an embodiment.

FIG. 11 illustrates an integrated electronic chart divided into arbitrary grids. Referring to the integrated electronic chart of FIG. 11, a sea area 91 through which a ship may pass, and a land area 92 may be distinguished and displayed. Here, the processor 14 may distinguish and display, among grids determined as passable areas, a sea area 922 of which the distance to a land is less than or equal to a preset distance, and a sea area 921 of which the distance to a land is greater than or equal to the preset distance. In addition, it may be determined that the ship may operate more safely in the sea area 921 than in the sea area 922, and thus, when determining route setting weights, the processor 14 may set the weight of the sea area 921 to be less than the weight of the sea area 922, such that the sea area 921 more affects route setting. Meanwhile, the integrated electronic chart divided into configurable grids in the embodiment of FIG. 11 may be an integrated electronic chart divided using a quadtree.

Meanwhile, when setting a route setting weight, whether the distance between the grid and a land is less than or equal to a preset distance may be considered. In other words, a grid of which the distance to a land is less than or equal to the preset distance may be set with a high route setting weight, and thus may be avoided when setting a route.

Here, the preset distance may be set in consideration of the total width of an area through which a ship may pass (e.g., sea or river). For example, when the total width of the area through which a ship can pass is narrower than when the total width of the area through which a ship can pass is wide, the preset distance may be set to be small.

According to an embodiment of the present disclosure, even when moving the same distance, a movement in an area with a high weight is avoided, and thus, it is possible to plan a safe route that maintains a certain distance away from a land. In addition, a route is set only with route setting weights without calculating the actual distance from a land, a gain in calculation time may be achieved.

Hereinafter, examples of integrated electronic charts generated by the processor 14 will be described with reference to FIGS. 12 and 13. Hereinafter, for convenience of description, the description will focus on an embodiment of a quadtree-based integrated electronic chart, but the present disclosure is not limited thereto, and embodiments of the present disclosure may be applied to all integrated electronic charts divided into configurable grids.

Figure 12:
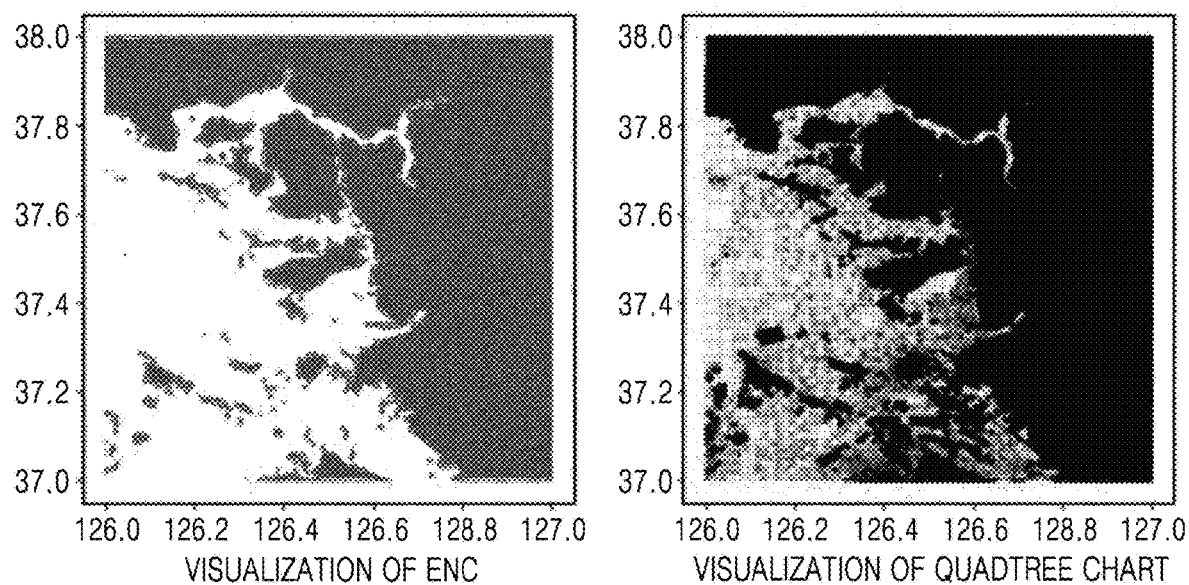
FIG. 12 is a diagram for describing an example of an integrated electronic chart generated by a processor using an integrated electronic chart generation method, according to an embodiment.

FIG. 12 is a diagram for describing an example of an integrated electronic chart generated by a processor using an integrated electronic chart generation method, according to an embodiment.

Figure 13:
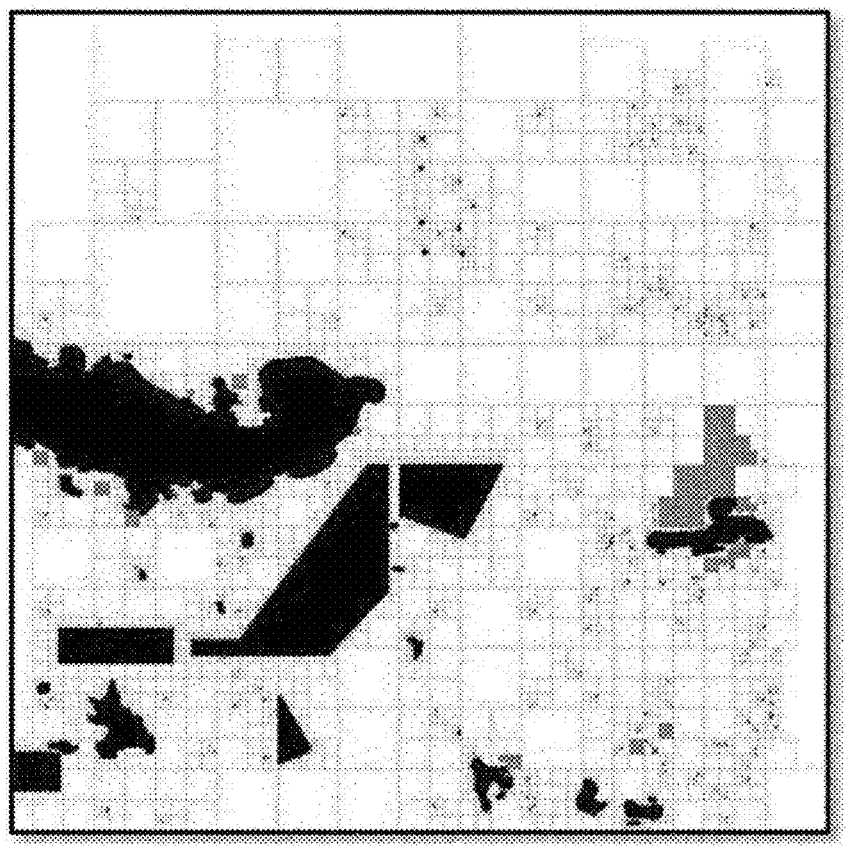
FIG. 13 is a diagram for describing another example of an integrated electronic chart generated by a processor using an integrated electronic chart generation method, according to an embodiment.

FIG. 13 is a diagram for describing another example of an integrated electronic chart generated by a processor using an integrated electronic chart generation method, according to an embodiment.

As illustrated in FIGS. 12 and 13, when visualizing an electronic navigational chart (ENC) stored in the electronic chart DB 130, detailed object information cannot be confirmed and the entire area needs to be viewed as grids are uniformly distributed over the entire area.

However, when using an integrated electronic chart divided by using a configurable grid, for example, a quadtree, the electronic chart may be monitored by using attribute information of the grid. For example, the processor 14 may express, in black, a grid on which a ship cannot travel, such as a land area, based on attribute information (e.g., 0) of the grid, or may monitor the electronic chart focusing on areas with a large number of grids by non-uniformly distributing grids according to object information contained in the grids.

For example, as illustrated in FIG. 13, a quadtree-based integrated electronic chart may be displayed in different colors or patterns based on attribute information. In an embodiment, in a quadtree-based integrated electronic chart, an area on which a ship cannot travel because the area has an attribute of 0 or is surrounded by an area with an attribute of 0, may be displayed in black, and may correspond to, for example, a land node. Here, an area displayed in black may correspond to the black block described above with reference to FIG. 8. In an embodiment, a submarine area near a land area may be displayed in blue, and an area of which the water depth becomes low due to a tidal difference may be displayed in gray. An area with no object but having a maritime environment that may affect the ship may be displayed with a separate color or mark. In an embodiment, in a quadtree-based integrated electronic chart, an area with an attribute of 1 but with an object such as an obstacle may be displayed in red. In addition, an area with no object such as an obstacle may be displayed in white. According to an embodiment of the present disclosure, each area may be shown in detail such that the user may conveniently perform monitoring and set a ship travel route. The colors described above are only exemplary embodiments, and each area may be separately depicted by using other distinguishing colors or marks.

As another example, for an object that requires more detailed depiction, for example, a marine parking area, by changing the minimum grid size of the object as well as the minimum grid interval of the object, the position of the object may be displayed accurately without significantly changing the overall chart capacity.

According to an embodiment of the present disclosure, by generating a quadtree-based integrated electronic chart, a minimum grid size for each object may variously adjusted according to terrain information such as a land terrain, a submarine terrain, an obstacle terrain, or a marine parking area, and by applying different grid sizes to respective objects to generate a quadtree-based integrated electronic chart, a position may be displayed accurately without significantly changing the storage capacity of the integrated electronic chart.

According to an embodiment of the present disclosure, a route may be set by using an integrated electronic chart generated by using the above-described quadtree. A route setting method according to an embodiment of the present disclosure may include setting a route from the origin to the destination by connecting grids other than grids containing objects or a grid surrounded and closed by the grids containing the objects.

For example, the processor 14 may calculate a collision risk of a host ship based on an integrated electronic chart to which object information (e.g., information about another ship) detected from a sensor is mapped. When second object information (e.g., another ship, a target, or a person) detected from a sensor is mapped to a grid that does not contain first object information (e.g. a land, a fish farm, or an anchoring area) included in an integrated electronic chart, the processor 14 may reset the route to include a grid with a low collision risk by considering a collision risk calculated for the current route and a possibility of the host ship avoiding a collision.

For example, the processor 14 may set an initial route based on a quadtree-based integrated electronic chart, and set the initial route by connecting grids that do not contain the first object information or grids with a low collision risk among the grids.

After setting the initial route, the processor 14 may calculate a host ship collision risk for each grid by mapping the second object information to the integrated electronic chart in real time, and calculate a collision risk of the corresponding grid based on the first object information included in each grid, the second object information mapped to the corresponding grid, the possibility of collision when the host ship travels along the initial route, the possibility of bypass of another ship when the second object is the other ship, and the like.

For example, the processor 14 may determine whether a second object is located on the initial route, by using host ship information including the position, speed, direction, and pose of the host ship, and when the second object is located, calculate a collision risk to be inversely proportional to the distance between the host ship and the second object. When the second object is another moving ship, a collision risk may be calculated based on an initial route passage time of the other ship and the distance between the host ship and the second object.

Then, a subset of grids may be changed according to the calculated collision risk, and the route may be reset accordingly. When the calculated collision risk is greater than a reference value, a grid through which the initial route passes may be changed to another grid.

As another example, the processor 14 may reset a bypass route within the same grid instead of changing the grid.

Hereinafter, an example of dividing an integrated electronic chart into grids using a configurable grid will be described with reference to FIG. 14.

Figure 14:
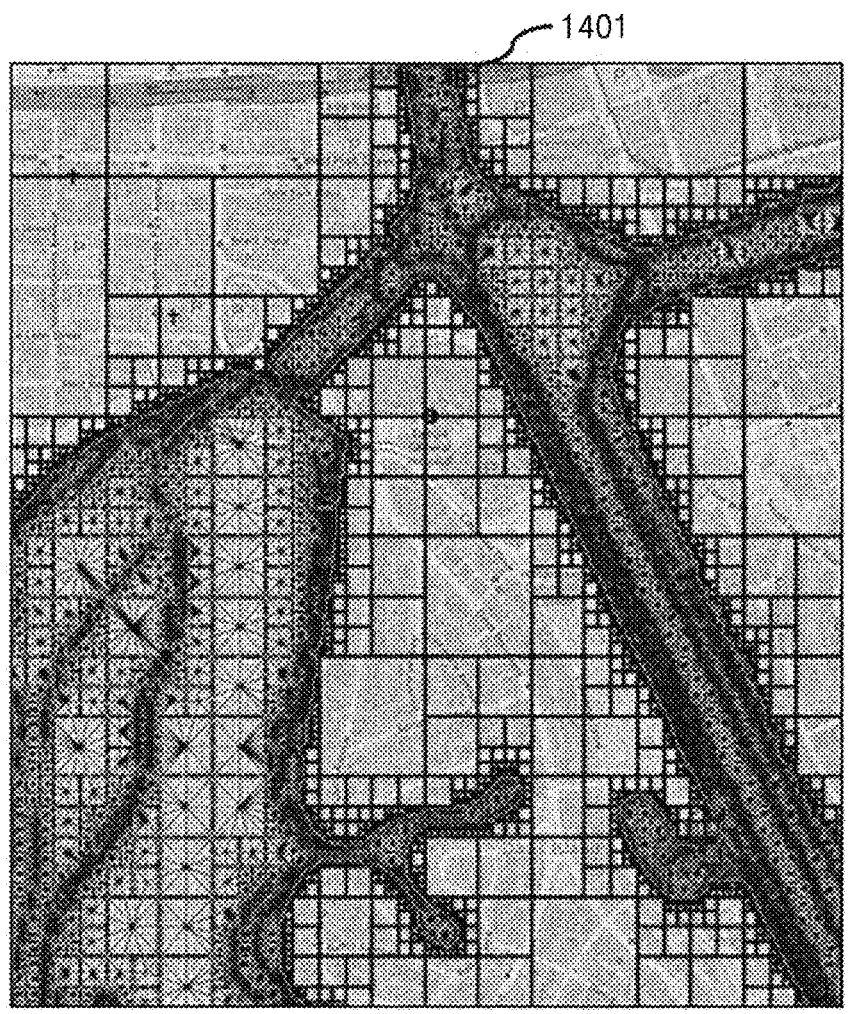
FIG. 14 is a diagram for describing another example of an integrated electronic chart generated by a processor using an integrated electronic chart generation method, according to an embodiment.

FIG. 14 shows a graph generated by dividing an integrated electronic chart 1401 using a configurable grid and connecting divided grids. Here, the arbitrary grid may be divided using a quadtree. The graph may be a line segment connecting adjacent grids among grids on which a ship may move. When connecting the grids to each other, the center points of the grids may be connected to each other or the vertices of the grids may be connected to each other, but the present disclosure is not limited thereto. Here, the connected graph may be used when setting a route.

According to an embodiment of the present disclosure, by dividing an integrated electronic chart into variable grids using a configurable grid, the processing efficiency may be improved by reducing the size of data occupied by the integrated electronic chart and shortening the access time to attribute information of each coordinate.

Hereinafter, an example of an integrated electronic chart generation device will be described with reference to FIG. 15.

Figure 15:
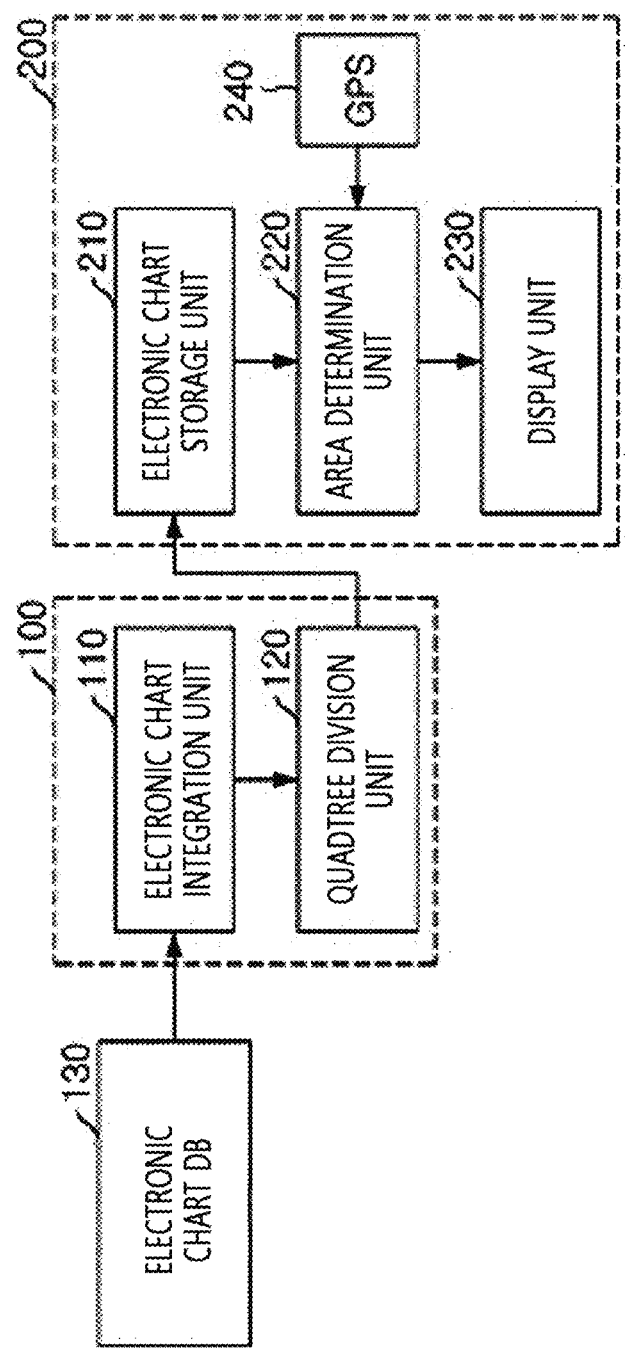
FIG. 15 is a block diagram illustrating a configuration of an integrated electronic chart generation device using a quadtree, and an shipboard user device, according to an embodiment.

FIG. 15 is a block diagram illustrating a configuration of an integrated electronic chart generation device and a shipboard user device, according to an embodiment.

As illustrated in FIG. 15, an integrated electronic chart generation unit 100 may include an electronic chart integration unit 110 and a quadtree division unit 120 that perform tasks by using the above-described instructions. The electronic chart integration unit 110 may receive a plurality of electronic charts with different scales stored in the electronic chart DB 130, and integrate them according to a scale based on an overlapping area. The quadtree division unit 120 may generate a grid-based integrated electronic chart by dividing the integrated electronic chart using a quadtree according to the presence or absence of an object.

The integrated electronic chart generated by the integrated electronic chart generation unit 100 may be divided according to each area, and may be stored in an electronic chart storage unit 210 of a shipboard device 200 as a divided electronic chart. The integrated electronic chart may be used in small capacity units by using the divided electronic chart, and thus may be viewed not only on a shipboard computing device but also on a portable device such as a mobile device.

When a global positioning system (GPS) 240 installed on the ship delivers the current position of the ship to an area determination unit 220, the area determination unit 220 may extract a divided integrated electronic chart containing an area corresponding to the current position and display it on a display unit 230.

Thus, the integrated electronic chart generation unit 100 may include instructions for performing operations S101 to S103 of FIG. 1, and according to execution of each operation, the operation may be logically distributed to the electronic chart integration unit 110 and the quadtree division unit 120. This is distribution according to function and may actually be implemented by integrating into one computing device, or may be implemented separately in each physically independent computing device.

Hereinafter, a computing device on which a method according to an embodiment of the present disclosure is performed will be described with reference to FIG. 16.

Figure 16:
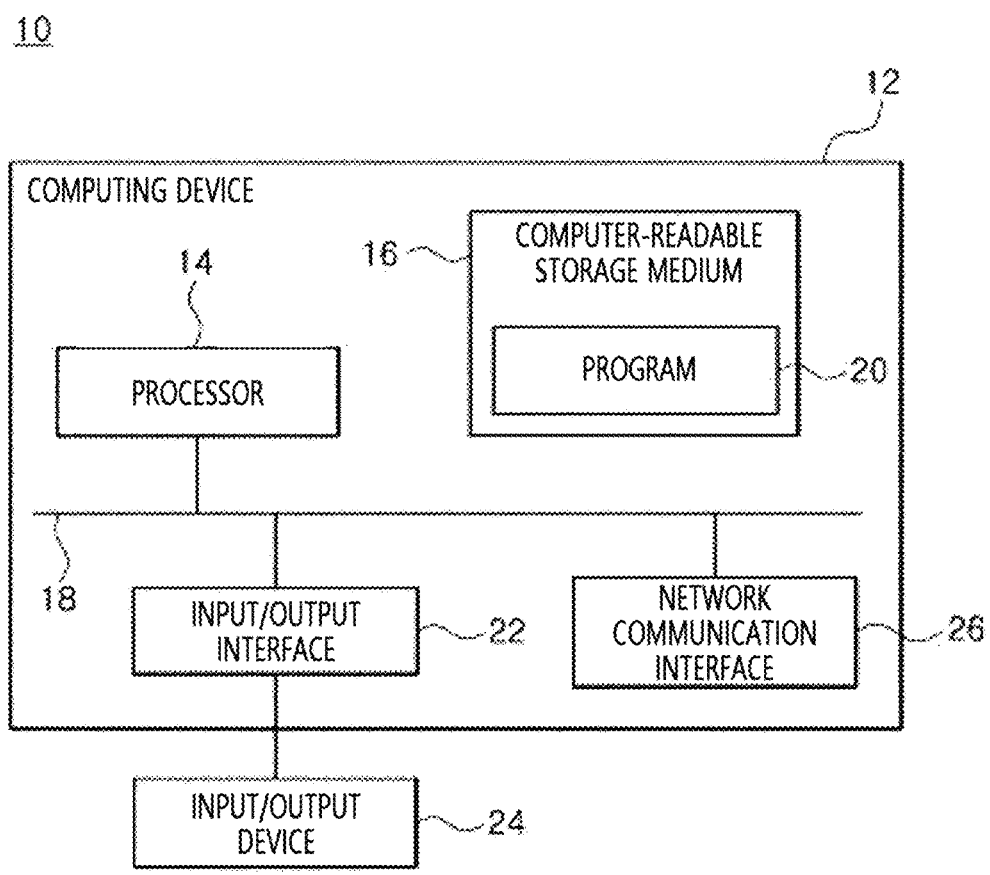
FIG. 16 illustrates a computing device on which a method according to an embodiment of the present disclosure is performed.

FIG. 16 is a block diagram for describing an example of a computing environment including a computing device, according to an embodiment of the present disclosure. In the illustrated embodiment, respective components may have different functions and capabilities in addition to those described below, and additional components other than those described below may be included.

A computing environment 10 illustrated in FIG. 16 may include a computing device 12, and the computing device 12 may include a non-transitory computer-readable storage medium having computer executable instructions that, when executed by a processor, perform the above-described method of generating an integrated electronic chart or method of generating an electronic chart by dividing a generated integrated electronic chart based on a configurable grid. In addition, the computing device 12 may include a non-transitory computer-readable storage medium having computer executable instructions that, when executed by a processor, perform a route setting method using an integrated electronic chart or an electronic chart divided into a configurable grid, which will be described below.

The computing device 12 includes at least one processor 14, a computer-readable storage medium 16, and a communication bus 18. The processor 14 may cause the computing device 12 to operate according to the example embodiments described above. For example, the processor 14 may execute one or more programs stored in the computer-readable storage medium 16. The one or more programs may include one or more computer-executable instructions, which, when executed by the processor 14, cause the computing device 12 to perform operations according to the example embodiments.

The computer-readable storage medium 16 is configured to store computer-executable instructions or program code, program data, and/or other suitable form of information. A program 20 stored in the computer-readable storage medium 16 includes a set of instructions executable by the processor 14. In an embodiment, the computer-readable storage medium 16 may be a memory (a volatile memory such as random-access memory, a non-volatile memory, or an appropriate combination thereof), one or more magnetic disk storage devices, optical disk storage devices, flash memory devices, other storage media that are accessible by the computing device 12 and capable of storing desired information, or a suitable combination thereof.

The communication bus 18 connects various components of the computing device 12, including the processor 14 and the computer-readable storage medium 16, to each other.

The computing device 12 may also include one or more input/output interfaces 22 configured to provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include, but is not limited to, input devices such as a pointing device (e.g., a mouse or a trackpad), a keyboard, a touch input device (e.g., a touchpad or a touch screen), a voice or sound input device, various types of sensor devices and/or photographing devices, and/or output devices such as a display device, a printer, a speaker, and/or a network card. The exemplary input/output device 24 may be included in the computing device 12 as a component constituting the computing device 12, or may be connected to the computing device 12 as a separate device from the computing device 12.

For example, an integrated electronic chart generation device according to an embodiment of the present disclosure is a computing device including a processor and a memory storing a computer program to be executed on a computer by the processor, wherein the computer program may include instructions for integrating a plurality of electronic charts according to an overlapping area and a scale, dividing the integrated electronic chart generated by integration into a grid by using a quad tree according to the presence or absence of an object, and redividing the divided grid by using a quadtree according to the presence or absence of an objects included in the divided grid or the presence or absence of an object interpolated based on a division result, based on a comparison between the size of the divided grid and a preset minimum grid size.

Hereinafter, an example of a navigational route setting device using an integrated electronic chart will be described with reference to FIG. 17.

Figure 17:
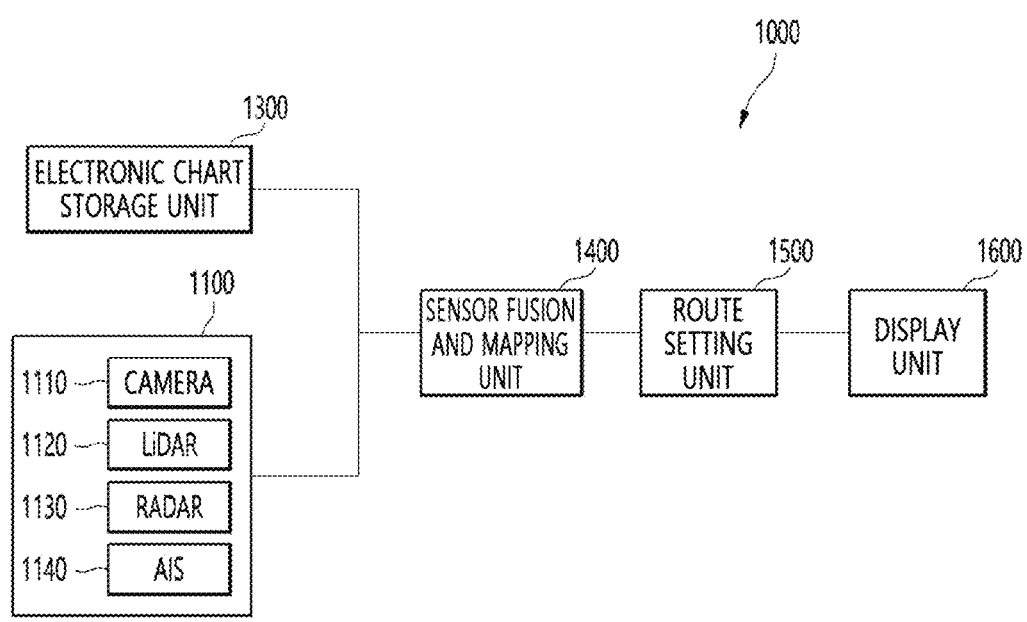
FIG. 17 is a block diagram for describing a route setting device using an electronic chart, according to an embodiment of the present disclosure.

FIG. 17 is a block diagram for describing a route setting device using an electronic chart, according to an embodiment of the present disclosure.

As illustrated in FIG. 17, a route setting device 1000 using an electronic chart according to an embodiment of the present disclosure may include an electronic chart storage unit 1300 configured to store at least one of a plurality of electronic charts, an integrated electronic chart, and an electronic chart (or integrated electronic chart) divided by a configurable grid, a sensor unit 1100 including a plurality of sensors (e.g., a light-detection-and-ranging (LiDAR) 1120 or a camera 1110) configured to sense the surroundings of a host ship, a sensor fusion and mapping unit 1400 configured to generate integrated object information by fusing various types of obtained object information with the integrated electronic chart, and map the integrated object information to a grid of the integrated electronic chart in real time, and a route setting unit 1500 configured to set a route from a starting point to a destination by connecting grids to which the object information is not mapped or grids with a low collision risk in the integrated electronic chart. In addition, the route setting device 1000 may further include a display unit 1600 configured to display the integrated object information, a collision risk for each object, and a host ship driving image mapped to a set route, on a single screen.

The sensor unit 1100 includes a sensor configured to sense the surroundings of the host ship. For example, the sensor unit 1100 may include a sensor installed primarily on large ships, such as a radar 1130 or an automatic identification system (AIS) 1140. As another example, the sensor unit 1100 may include a front camera included in a small ship, a surround view monitor (SVM) camera, a LIDAR 1120, a radar 1130, an AIS 1140, a sonar, and the like. The front camera may sense the type of an obstacle, pixel coordinates in an image domain, and the approximate position of an obstacle within 300 meters. The SVM camera may sense the distance to the nearest obstacle. The LiDAR 1120 may sense the exact position of an obstacle at a distance of 10 to 200 meters, and provide indicators for collision risk assessment such as Speed Over Ground (SOG), Course Over Ground (COG), Closest Point of Approach (CPA), or Time to Closest Point at Approach (TCPA). The radar 1130 may sense the position of an obstacle at a distance of 200 meters to 8 kilometers, and provide indicators for collision risk assessment such as SOG, COG, CPA, or TCPA. The AIS 1140 may sense the position of an obstacle over several kilometers and the direction of the bow, and may provide indicators for collision risk assessment such as SOG, COG, CPA, or TCPA. The sonar may sense a depth below a water surface with precision in real time.

The electronic chart storage unit 1300 according to an embodiment of the present disclosure may store a plurality of electronic charts with different scales and/or an integrated electronic chart obtained by performing preprocessing and integration according to a scale level based on an overlapping area of the plurality of electronic charts. In addition, the electronic chart storage unit 1300 according to an embodiment of the present disclosure may store an integrated electronic chart divided into a configurable grid, or a quadtree-based integrated electronic chart.

The electronic chart storage unit 1300 may store a plurality of electronic charts with various scale levels according to different purposes and areas, and when storing an electronic chart in which a plurality of electronic charts with different scales are integrated, may generate the integrated electronic chart by combining electronic charts that may obtain the highest resolution image with respect to an overlapping area with the largest scale among the plurality of electronic charts.

The sensor fusion and mapping unit 1400 according to an embodiment of the present disclosure may be configured to integrate object information and remove duplicate second object information. As described above, the processor 14 may obtain first object information contained in an integrated electronic chart, and second object information detected from a sensor. Here, the first object information and the second object information may be redundantly generated for the same object. In particular, a plurality of sensors may redundantly sense the same object, thereby generating a plurality of pieces of second object information. Thus, the sensor fusion and mapping unit 1400 may need to integrate a subset of the plurality of pieces of second object information indicating the same object. Object information integrated by the sensor fusion and mapping unit 1400 may be called integrated object information.

The sensor fusion and mapping unit 1400 may classify the integrated object information generated by integrating multiple sensor data into static objects and dynamic objects. For example, the sensor fusion and mapping unit 1400 may classify the dynamic objects and static objects using the properties of multiple sensor data such as speed, direction, and data type. For example, the sensor fusion and mapping unit 1400 may classify the integrated object information including the first object information as a static object. For example, the sensor fusion and mapping unit 1400 may classify the integrated object information having a speed higher than the minimum speed as a dynamic object using only the second object information.

For example, the sensor fusion and mapping unit 1400 may identify and integrate second object information detected from data from the LiDAR 1120, and second object information detected from an image from the camera 1110, both existing within a preset range. In addition, the sensor fusion and mapping unit 1400 may be configured to remove a subset of the plurality of pieces of second object information detected in a preset area of the integrated electronic chart, for example, second object information detected in a land area of the integrated electronic chart. For example, the sensor fusion and mapping device 1400 may delete second object information that may be integrated with first object information included in the integrated electronic chart. For example, the sensor fusion and mapping unit 1400 may delete the second object information mapped to the same grid cell as the first object information. For example, the sensor fusion and mapping unit 1400 may delete the second object information stored in the grid cell and map the first object information, or reject the mapping of the second object information to the grid cell to which the first object information is mapped.

The route setting unit 1500 according to an embodiment of the present disclosure may be configured to calculate a probability-based collision risk of the host ship based on an integrated electronic chart to which object information is mapped, and when object information occurs in a grid to which object information is not mapped, change selected grids based on a collision risk calculated for a current route and the possibility of the host ship avoiding a collision, and reset the route. The route setting unit 1500 may calculate the collision risk in different ways depending on the classification of the static object and the dynamic object. For example, the route setting unit 1500 may calculate the collision risk for the static object based only on the location of the static object and the collision risk for the dynamic object based on at least some of the position, the relative movement, velocity of the dynamic object. The present invention includes, but is not limited to, a method for calculating an optimized collision risk according to an object classification.

Meanwhile, hereinafter, an 'integrated electronic chart' for setting a route may be understood as a concept that includes both an integrated electronic chart generated according to an embodiment of the present disclosure or an electronic chart obtained by dividing a generated integrated electronic chart based on a quadtree.

The above-described configuration may be performed within one computing device in logically divided units according to function, or may be implemented in independent units according to respective functions. For example, the above-described configuration may be performed by processor 14 of FIG. 16.

The route setting device 1000 described above may perform a route setting method using a quadtree-based electronic chart according to an embodiment of the present disclosure. Hereinafter, an example of a method of setting a route using a quadtree-based electronic chart will be described with reference to FIG. 18.

Figure 18:
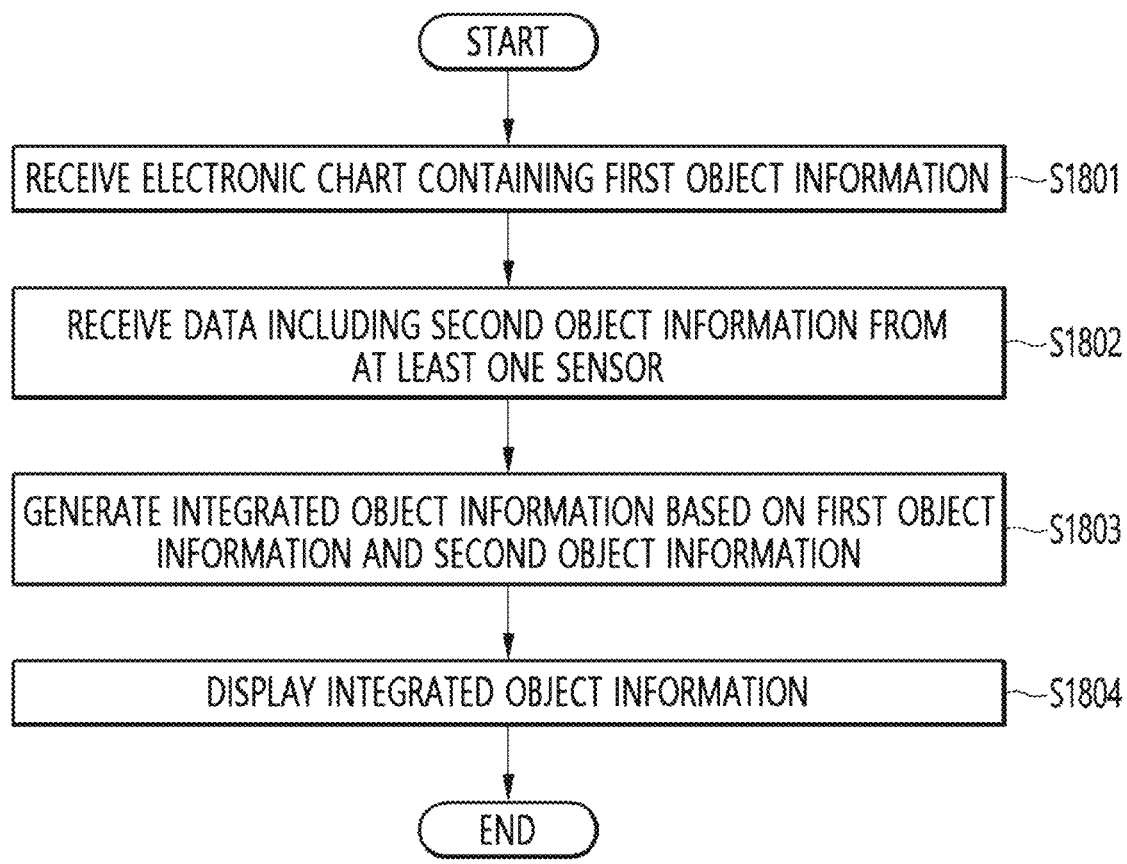
FIG. 18 is a flowchart for describing an example of a method by which a processor sets a navigational route by using a quadtree-based electronic chart, according to an embodiment.

FIG. 18 is a flowchart for describing an example of a method by which a processor sets a navigational route by using an integrated electronic chart, according to an embodiment. Hereinafter, operations S1801 to S1804 are described as being performed by the processor 14, but are not limited thereto and may also be performed by the sensor fusion and mapping unit 1400, the route setting unit 1500, and the display unit 1600 of FIG. 17.

In operation S1801, the processor 14 receives an electronic chart containing first object information. For example, the processor 14 may receive a quadtree-based integrated electronic chart generated by a server. The first object information refers to information about objects included in the integrated electronic chart. For example, the first object information may include information about a land, a port, a fixed obstacle, a fish farm, or an anchoring area. Integrated electronic charts are of various types depending on their purpose, contain a variety of data such as a water depth, tides, or a navigational hazard, and may have different levels, that is, different scales.

In operation S1802, the processor 14 receives data including second object information from at least one sensor. The second object information refers to information about objects detected based on sensor data obtained from a sensor. For example, the second object information may include another ship, a target, or a person. Thus, the second object information may be distinguished from the first object information that may be obtained from the integrated electronic chart. The processor 14 may obtain the second object information using various sensors such as the radar 1130, the AIS 1140, a front camera, an SVM camera, a LIDAR 1120, or a sonar. According to another embodiment of the present disclosure, although operation S1802 is described as being performed after operation S1801, operation S1801 and operation S1802 may be performed simultaneously.

Meanwhile, the obtained first object information and second object information may be managed as a common data structure.

TABLE 1

|  | Recognition sensor | Decimal value |
|---|---|---|
| Front camera | True | $2^0 * 1$ |
| SVM camera | False | $2^1 * 0$ |
| LiDAR | True | $2^2 * 1$ |
| RADAR | True | $2^3 * 1$ |
| AIS | False | $2^4 * 0$ |
| SONAR | True | $2^5 * 1$ |
| Electronic chart | False | $2^6 * 0$ |
| Result value |  | 45 |

Referring to Table 1, the processor 14 may derive a sum of decimal values for the presence or absence (True or False) of a plurality of sensors and an electronic chart, as a result value. In other words, the processor 14 may determine which sensors exist only with the result value. According to an embodiment of the present disclosure, the processor 14 manages the obtained object information as a common data structure such that it may be commonly used. When fog, a wave, or the like that is not a physical object that interferes with actual driving, is detected as an object by the AIS 1140, the LIDAR 1120, or the camera 1110 due to environmental factors, the processor 14 may filter it out using a noise removal algorithm.

In an embodiment, when only the camera 1110 and the LiDAR 1120 that may be installed on a small ship are installed, the processor 14 may detect an object located around the small ship, perform object filtering using land information of the integrated electronic chart and a noise removal algorithm, and then perform recognition to identify the type of the filtered object.

In another embodiment, when information obtained from the radar 1130 or the AIS 1140 may be obtained, the processor 14 may select only objects corresponding to navigational obstacles by performing sensor fusion on the first object information of the integrated electronic chart and the second object information that is filtered by using a noise removal algorithm.

In operation S1803, the processor 14 may generate integrated object information based on the first object information and the second object information, and map the integrated object information to a grid of the integrated electronic chart. Meanwhile, the processor 14 may integrate object information detected in data from the LIDAR 1120 and object information detected in an image from the camera 1110 existing within a preset range.

According to an embodiment, the processor 14 may filter the second object information detected in a land area of the integrated electronic chart. Here, the processor 14 may filter the second object information by using a noise removal algorithm, and integrate the filtered object information to generate integrated object information. For example, when the second object information obtained from the plurality of sensors is mapped to the same grid as the first object information of the integrated electronic chart, the processor 14 may filter the second object information by using a noise removal algorithm, and integrate object information for the filtered object. Because land information is electronic chart information irrelevant to driving of a ship, the memory capacity may be saved by filtering or deleting the second object information detected in the grid containing the first object information of the integrated electronic chart.

Information obtained from the sensor unit 1100 may redundantly detect the same object, and thus, when sensor data is used without processing the information, errors may occur in route setting or the like. According to an embodiment of the present disclosure, the above-described problem may be solved by generating integrated object information about the same object using the first object information and the second object information.

The processor 14 may use the first object information and the second object information to generate integrated object information about the same object by considering the position of the object, the size of the object, the speed of the object, the moving direction of the object, and the like.

In an additional embodiment, the integrated object information generated in operation S1803 may be mapped to mapping data divided into a configurable grid. Here, particular mapping data divided into a configurable grid may be an electronic chart (or an integrated electronic chart according to an embodiment of the present disclosure), data sensed from a plurality of sensors 2201 (an image-based object recognition result obtained by the camera 111), or the like. In an embodiment, with respect to the arbitrary grid, a method of generating the grid, the shape (which may be uniform or non-uniform) and size of grid cells constituting the grid, and information contained in the grid cells may be freely selected.

Meanwhile, when data to which the integrated object information is mapped is an electronic chart divided into a configurable grid, the electronic chart may be an electronic chart containing the first object information mentioned in S1801 divided into a configurable grid, but may also be a separate electronic chart divided into a configurable grid.

In operation S1804, the processor 14 displays the integrated object information. According to an embodiment, the processor 14 may display the integrated object information based on mapping data that is mapped to the integrated object information and divided into a configurable grid. In a specific example, the processor 14 may display the integrated object information based on an electronic chart or monitoring image to which an integrated object is mapped. In a specific embodiment, the monitoring image is an image generated based on data sensed from the sensors 2201, and may be a cluster image representing the surrounding environments of the host ship as a three-dimensional model. The processor 14 may create or change a route using the integrated object information. The processor 14 may display the created or changed route together with the integrated object information.

Hereinafter, examples of information obtained by sensing an object around a host ship, and generation of integrated object information by using sensing information will be described with reference to FIGS. 19 and 20.

Figure 19:
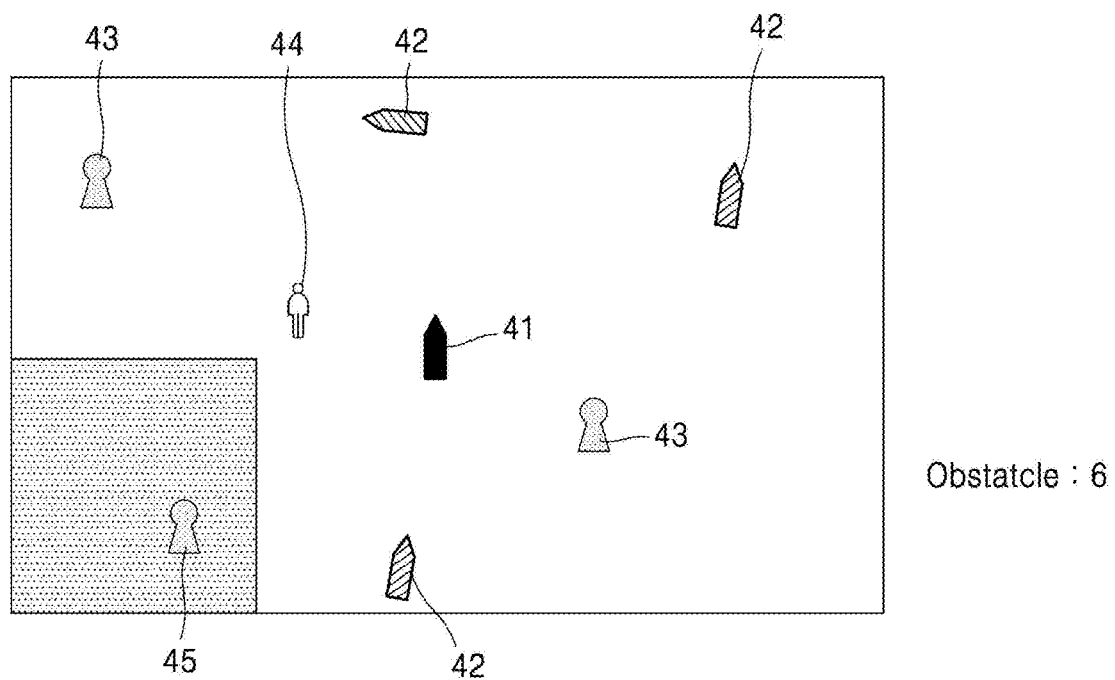
FIG. 19 is a diagram briefly illustrating objects around a host ship.

FIG. 19 is a diagram briefly illustrating objects around a host ship. FIG. 20 is a diagram for describing information obtained by a processor from sensors sensing the objects of FIG. 19, according to an embodiment.

As illustrated in FIG. 19, external ships 42 or marine structures 43 may be located around a host ship 41, and there may be a person 44 who fell from the host ship 41. In addition, when the host ship 41 performs a berthing or unberthing or moves close to a land, there may be the land or an obstacle 45 located on the land around the host ship 41.

Figure 20:
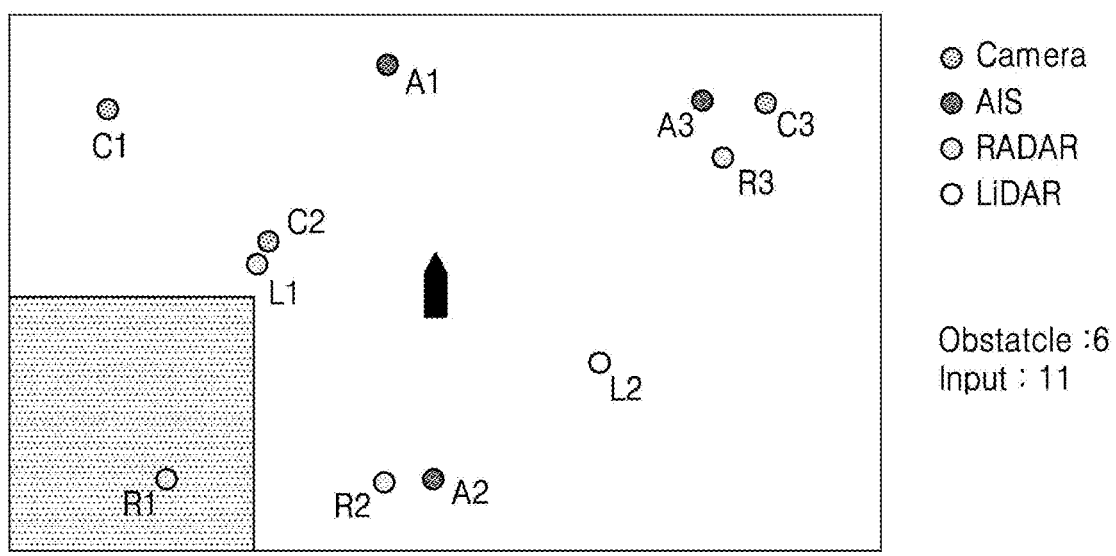
FIG. 20 is a diagram for describing information obtained by a processor from sensors sensing the objects of FIG. 19, according to an embodiment.

As illustrated in FIGS. 19 and 20, there are six actual obstacles in the ocean where the host ship 41 travels. However, the camera 1110 may detect three objects C1, C2, and C3, the AIS 1140 may detect three objects A1, A2, and A3, the radar 1130 may detect three objects R1, R2, and R3, and the LiDAR 1120 may detect two objects L1 and L2.

In other words, while there are 6 actual obstacles located in the ocean, the processor 14 may detect only part of the actual obstacles as objects depending on the type of sensor and detect the same obstacle redundantly, and thus may receive 11 inputs as illustrated in FIG. 20.

The processor 14 according to an embodiment of the present disclosure may integrate detections of the same object and reserve detections of different objects. In addition, the processor 14 converts sensor data obtained from a plurality of sensors into the same format and performs the above-described sensor data processing, and thus may consistently process various pieces of sensor data obtained from the plurality of sensors when using them for calculating a collision risk or the like. Hereinafter, an example in which the processor 14 generates integrated object information will be described with reference to FIGS. 21A-21B.

Figure 21A:
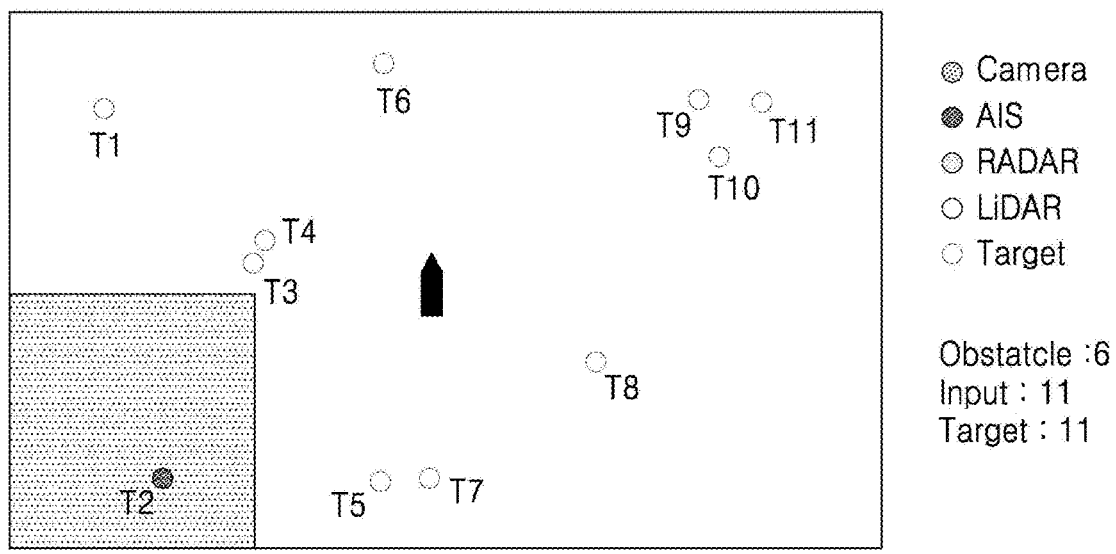
FIGS. 21A-21B are diagrams for describing an example in which a processor generates integrated object information, according to an embodiment.
Figure 21B:
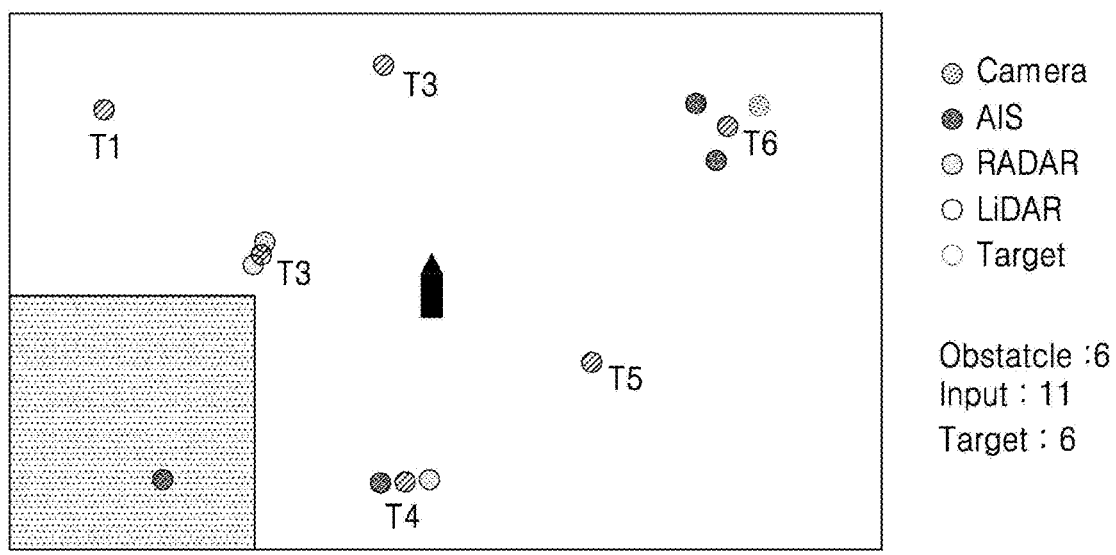

FIGS. 21A-21B are diagrams for describing an example in which a processor generates integrated object information about the same object, according to an embodiment.

As illustrated in FIG. 21A, when the processor 14 does not integrate sensor data, all data obtained by each of the camera 1110, the LiDAR 1120, the radar 1130, and the AIS 1140 are detected as objects. Thus, there may be 11 target objects to avoid, not the actual 6 obstacles, which may result in an error.

The processor 14 needs to set a longer avoidance route for the host ship 41 to avoid the 11 detected target objects, which may result in a decrease in driving efficiency due to unnecessary waste of fuel.

On the contrary, as illustrated in FIG. 21B, when the processor 14 integrates and organizes sensor data, by determining inputs obtained within a certain range as detection of the same object, and integrating sensor data, 6 target objects identical to the 6 actual obstacles may be detected.

For example, as illustrated in FIG. 21A, the processor 14 may recognize T3 and T4, which are recognized by both the camera 1110 and the LiDAR 1120 and are located very close to each other on the chart, as one obstacle, and integrate them into 'T2' as illustrated in FIG. 21B.

In addition, as illustrated in FIG. 21A, the processor 14 may recognize T9, T10, and T11, which are recognized by the AIS 1140 and the radar 1130, additionally recognized by the camera 1110, and are located close to each other on the chart, as one obstacle, and integrated them into 'T6' as illustrated in FIG. 21B.

In addition, as illustrated in FIG. 21A, the processor 14 may recognize T5 and T7, which are recognized by both the AIS 1140 and the radar 1130 and are located close to each other on the chart, as one obstacle, and integrate them into 'T4' as illustrated in FIG. 21B.

In an embodiment, when inputs are recognized by both the AIS 1140 and the radar 1130, which are sensors installed on a large ship, and the recognized inputs are located close to each other, the processor 14 may regard them as one target object and fuse sensor data.

Even when pieces of sensor data obtained from a plurality of different sensors are located close to each other, the processor 14 may regard the sensor data as one target object and fuse the sensor data. The processor 14 may additionally integrate electronic charts and sensor data. For example, the processor 14 may determine the second object information adjacent to the first object information as the same as the first object information. For example, the processor 14 may classify the second object information adjacent to the first object information as a static object, like the first object information. The adjacent distance may be set in advance, may be a value input by the user, or may be a value defined by the processor 14 based on the ship's specification information. For example, the processor 14 may adjust the adjacent distance based on the ship's specification information. The processor 14 may save computing resources by classifying ships anchored adjacent to land as static objects.

In addition, the processor 14 may further integrate and organize the sensor data of the electronic chart, and in this case, when the radar 1130 detects the land or the obstacle 45 located on the land, the processor 14 may exclude the obstacle 45 from the target objects by using the sensor data of the electronic chart. Because the host ship 41 does not drive on land, computing resources may be saved by ignoring obstacles in the corresponding area by using land information of the electronic chart.

As illustrated in FIGS. 21A-21B, T2 detected by the radar 1130 is an obstacle located on the land on the electronic chart, and objects located on land on the electronic chart may be removed or deleted without being used for sensor data fusion.

Thus, recognition errors may be reduced not by simply listing sensor data, which is recognition results by a plurality of sensors, but by fusing them, such as integrating or deleting them, and displaying them on a single electronic chart.

In addition, by mapping object information fused with the electronic chart and plotting it as illustrated in FIG. 21B, rather than simply arranging the object information fused with the electronic chart side by side on a screen, a user who is driving while keeping eyes forward may easily monitor results detected by the sensors, and there is no room to confuse the user with unnecessary information for driving, such as a land or the obstacle 45 located on a land.

Meanwhile, object information may include probability information regarding the existence of an object. The probability information may be expressed as a probability model and may be calculated by using a Kalman filter. In addition, the integrated object information may include integrated probability information generated by integrating probability information of objects. In addition, the integrated electronic chart may be provided with the integrated probability information mapped to the grid of the integrated electronic chart.

According to an embodiment of the present disclosure, by using probability information, it is possible to provide stable information through a tracking algorithm, facilitate a subsequent process of integrating object information, and reflect the recognition accuracy of objects in various ways by reflecting the characteristics of data from each sensor.

Hereinafter, an example of generating and mapping integrated object information by using a plurality of sensors will be described with reference to FIG. 22.

Figure 22:
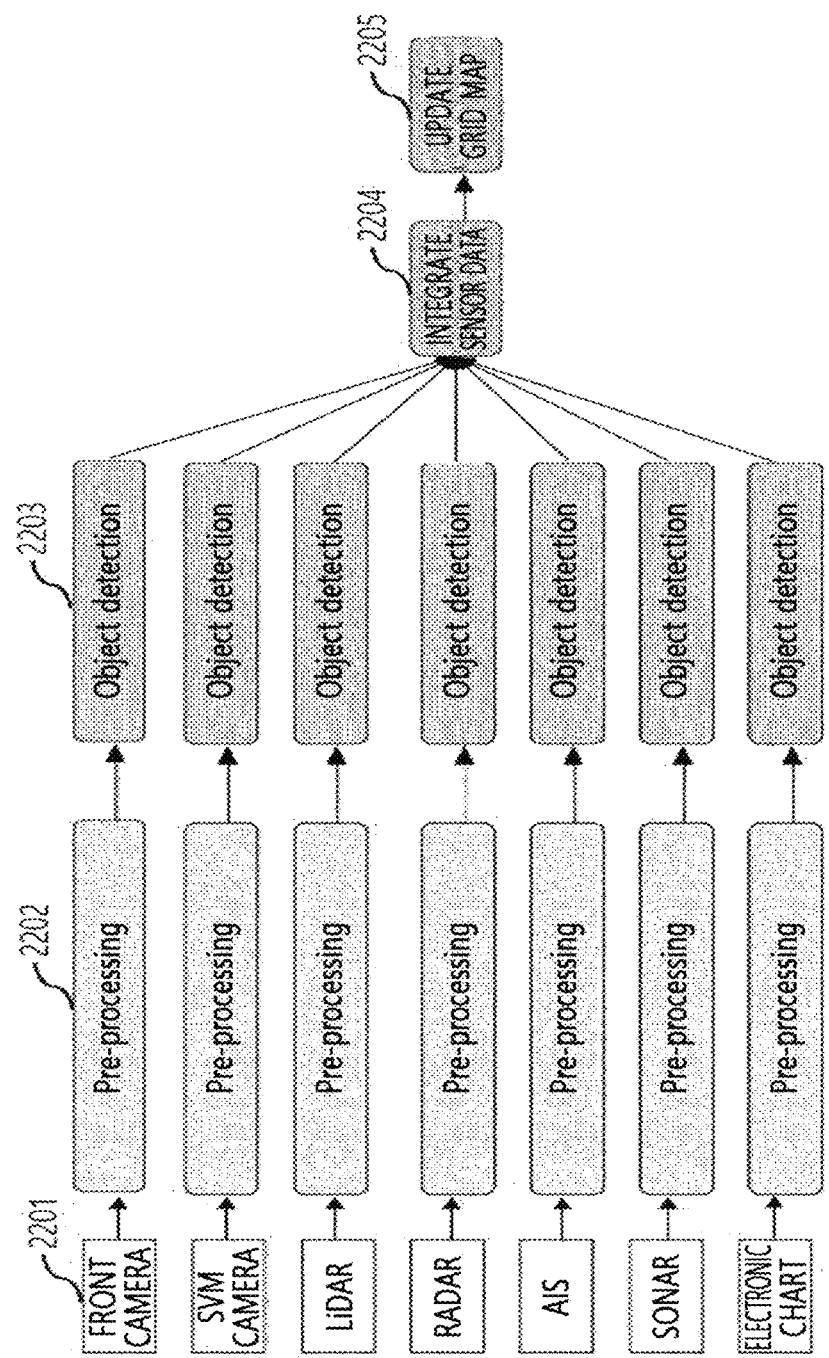
FIG. 22 is a diagram for describing an example of a method by which a processor generates and maps integrated object information using a plurality of sensors, according to an embodiment.

Referring to FIG. 22, the processor 14 may preprocess data 2202 obtained from the plurality of sensors 2201. For example, the processor 14 may receive sensed data from the plurality of sensors 2201, and parse and convert the sensed data for each sensor manufacturer.

In addition, the processor 14 may generate object information by recognizing an object based on the parsed and converted data 2203. Here, the generated object information may be managed as a common structure as described above.

In addition, the processor 14 may fuse the object information to generate integrated object information 2204 and map the integrated object information to mapping data divided into a configurable grid 2205. The mapping data divided into a configurable grid may include an integrated electronic chart divided into a configurable grid.

Referring again to FIG. 18, in operation S1804, the processor 14 may generate a collision avoidance route by connecting grids to which the integrated object information is not mapped, or grids with a low collision risk in the integrated electronic chart.

Meanwhile, the processor 14 may calculate a probability-based collision risk for each of the grids of the integrated electronic chart based on the probability information or the integrated probability information. The probability-based collision risk may be calculated based on the probability information or the integrated probability information. Alternatively, the probability-based collision risk may be the probability information or the integrated probability information.

In addition, the processor 14 may obtain host ship information using a GPS sensor, a gyrocompass, and/or an inertial measurement unit (IMU) installed on the host ship, and add the host ship information to calculate a probability-based collision risk of the host ship. Hereinafter, another example of an integrated electronic chart according to an embodiment of the present disclosure will be described with reference to FIG. 23.

Figure 23:
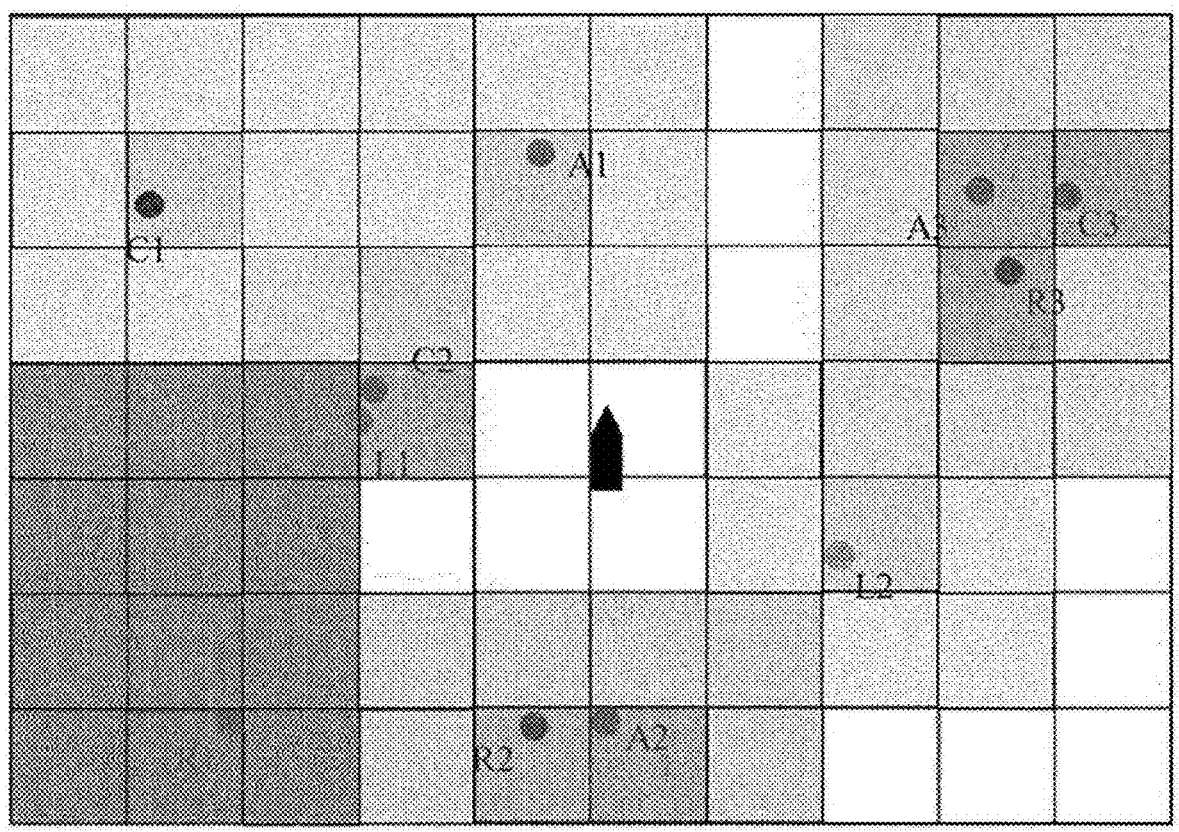
FIG. 23 is a diagram for describing another example of an integrated electronic chart generated by a processor, according to an embodiment.

FIG. 23 is a diagram for describing another example of an integrated electronic chart generated by a processor, according to an embodiment.

In the embodiment of FIG. 23, it is assumed that mapping data to which integrated object information is mapped is an integrated electronic chart divided into a configurable grid. Referring to FIG. 23, the integrated electronic chart may be provided with the integrated probability information mapped to the grid of the integrated electronic chart. The integrated electronic chart contains pieces of object information C1, C2, and C3 recognized from a camera, pieces of object information A1, A2, and A3 recognized from an AIS, pieces of object information R1, R2, and R3 recognized from a radar, and pieces of object information L1 and L2 recognized from a LiDAR.

In addition, probability information included in pieces of object information is mapped to and displayed on the grid of the integrated electronic chart. The probability information included in the object information may be integrated, mapped to integrated probability information, and then displayed. Here, the probability information may be calculated using a Kalman filter.

In addition, according to an embodiment of the present disclosure, mapping object information, a collision risk with an object, and a set or reset route to a host ship driving image and displaying a result of the mapping on a single screen may be further included. Hereinafter, an example of displaying an avoidance route set by the processor 14 will be described with reference to FIG. 24.

Figure 24:
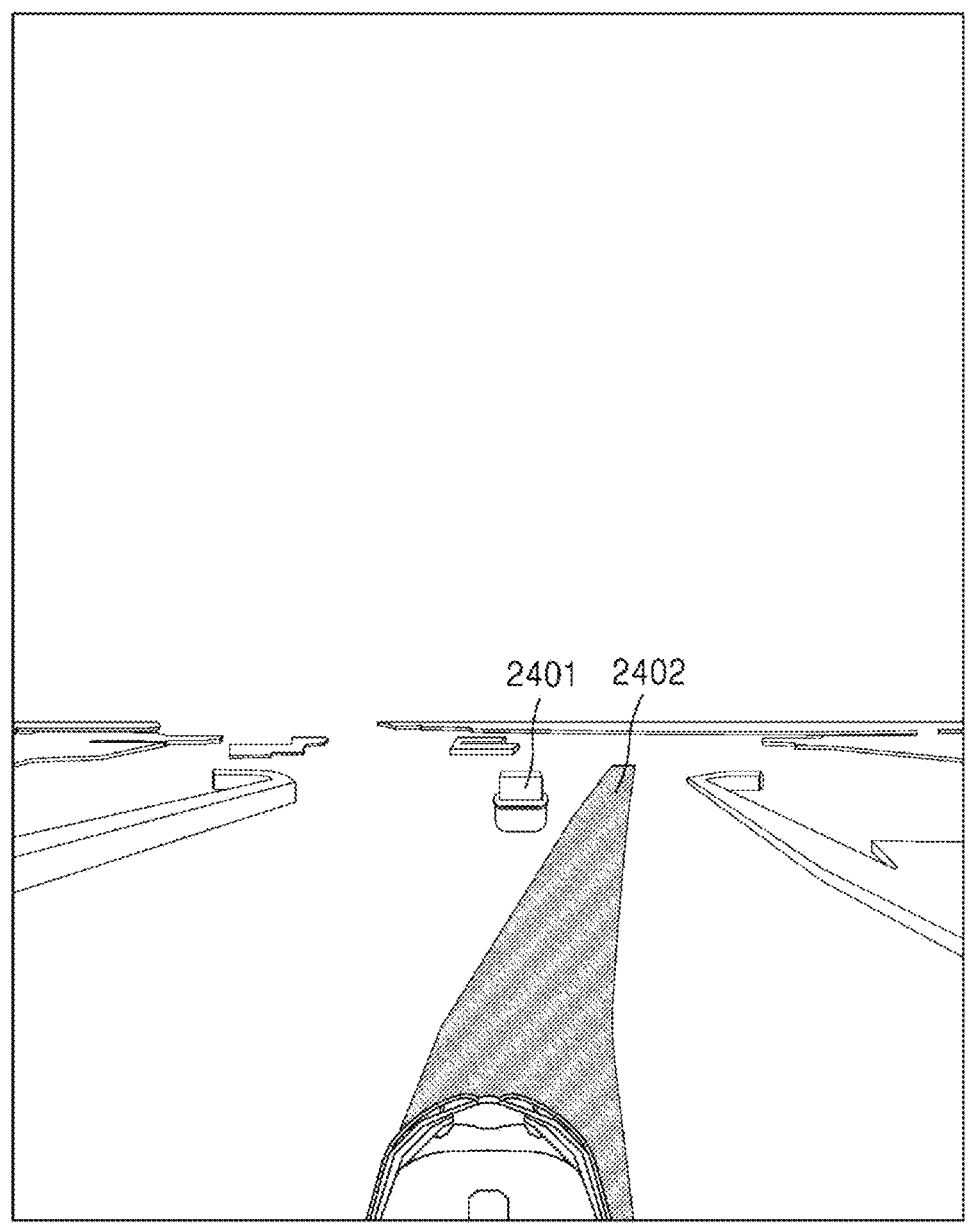
FIG. 24 is an example screen of a display unit of a route setting device using an electronic chart, according to an embodiment.

FIG. 24 is an example screen of a display unit of a route setting device using an electronic chart, according to an embodiment.

As described above, the processor 14 may display integrated object information based on an electronic chart or monitoring image to which an integrated object is mapped. FIG. 24 illustrates an example of a monitoring image, showing an example of a cluster screen that briefly expresses a host ship driving environment as a three-dimensional model. In more detail, on the screen of FIG. 24, integrated object information 2401 generated by fusion of sensor data detected by the sensor unit 1100 may be displayed as a three-dimensional model, and a collision avoidance route 2402 of the host ship that is set based on the integrated object information 2401 may also be displayed. The integrated object information 2401 may include static object information and dynamic object information. For example, the integrated object information 2401 may include both land information and sea obstacle information. Since the processor 14 displays the integrated object information as a three-dimensional model, the user may be able to intuitively understand the operating environment.

In more detail, when there is another ship on the traveling route of the host ship, the other ship may be displayed as one piece of integrated object information 2401, and the avoidance route 2402 inclined to avoid the integrated object information 2401 may be displayed. That is, the processor 14 may detect an actual obstacle as a target object based on the integrated object information, and display the integrated object information generated by fusion of sensor data on a front screen while driving, thereby assisting the user navigating and is keeping eyes forward.

In addition, a collision avoidance route may be set based on the maneuverability of the host ship to avoid colliding with an object detected ahead, for example, another ship, from the current position of the host ship, and the collision avoidance route may be displayed on a screen with respect to the current position of the host ship.

The display unit 1600 may display at least one of integrated object information, a collision risk, and a collision avoidance route.

The display unit 1600 according to an embodiment of the present disclosure may integrate all of a detected object, the type of the object, the distance between the object and the host ship, the possibility of collision, and an avoidance route, and display a result of the integrating on one screen. In addition, electronic charts may be merged and displayed to determine the overall route or the position of the host ship, and host ship information including the speed, RPM, gear, and the like of the host ship may be displayed.

Meanwhile, the processor 14 may calculate a probability-based collision risk of the host ship based on an integrated electronic chart to which integrated object information is mapped, and when object information occurs in a grid to which object information is not mapped, change some grids by considering a collision risk calculated for the current route and the possibility of the host ship avoiding a collision, and reset the route. Hereinafter, an example in which the processor 14 resets a route will be described with reference to FIG. 25.

Figure 25:
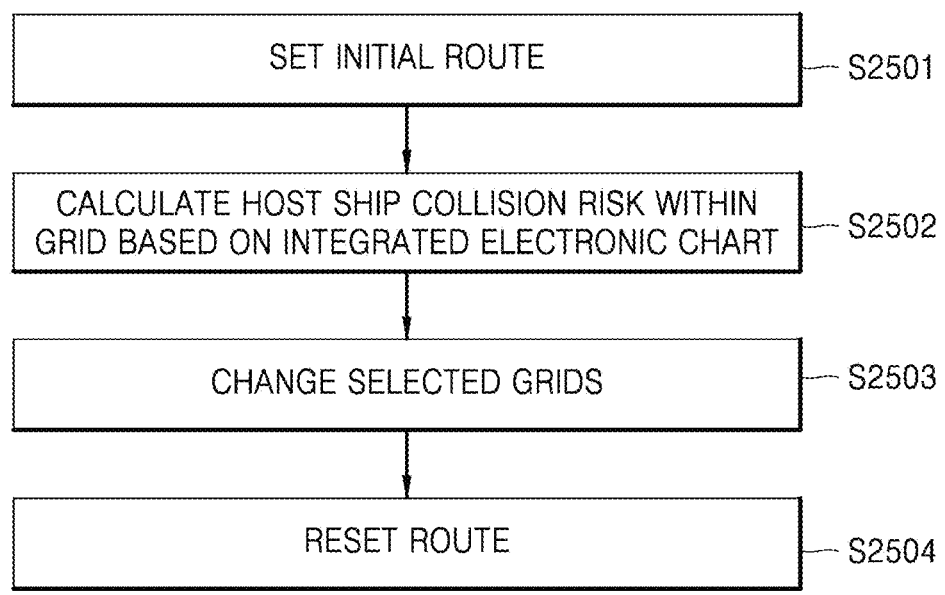
FIG. 25 is a diagram for describing an example of a process in which a processor resets a route, according to an embodiment.

FIG. 25 is a diagram for describing an example of a process in which a processor resets a route, according to an embodiment.

As illustrated in FIG. 25, the processor 14 may set an initial route based on a quadtree-based integrated electronic chart (S2501). The processor 14 may set the initial route by connecting grids to which object information is not mapped or grids with a low collision risk among grids.

After setting the initial route, the processor 14 may calculate a host ship collision risk within the grid based on an integrated electronic chart (S2502). The processor 14 may calculate the collision risk based on object information mapped within each grid, the possibility of collision when the host ship travels along the initial route, and the possibility of bypass of another ship if the object is the other ship.

For example, the processor 14 may determine whether an object is located on the initial route, by using host ship information including the position, speed, direction, and pose of the host ship, and when the object is located, calculate a collision risk to be inversely proportional to the distance between the host ship and the object. When the object is another moving ship, the processor 14 may calculate a collision risk based on an initial route passage time of the other ship and the distance between the host ship and the object.

Then, the processor 14 may change selected grids according to the calculated collision risk (S2503), and reset the route accordingly (S2504). When the calculated collision risk is greater than a reference value, the processor 14 may change a grid through which the initial route passes to another grid.

In another embodiment, the processor 14 may reset a bypass route within the same grid instead of changing the grid.

Meanwhile, when the processor 14 needs to set a bypass route because the calculated collision risk is high, the display unit 1600 may recommend a candidate collision avoidance route and display the recommended route on a forward driving screen of the host ship.

Meanwhile, the processor 14 may set a plan route from an origin to a destination based on an integrated electronic chart. In addition, the processor 14 may modify the planned route based on a collision avoidance route generated while performing operation S2504 described above.

Meanwhile, the above-described method may be written as a computer-executable program, and may be implemented in a general-purpose digital computer that executes the program by using a computer-readable recording medium. In addition, the structure of the data used in the above-described method may be recorded in a computer-readable recording medium through various units. The computer-readable recording medium includes a storage medium, such as a magnetic storage medium (e.g., read-only memory (ROM), random-access memory (RAM), a universal serial bus (USB) drive, a floppy disk, a hard disk, etc.) and an optically readable medium (e.g., a compact disc ROM (CD-ROM), a digital video disc (DVD), etc.).

The above-described method may be provided in a computer program product. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

It will be understood by those of skill in the art that the present disclosure may be implemented in a modified form without departing from the intrinsic characteristics of the descriptions provided above. Therefore, the disclosed methods should be considered in an illustrative rather than a restrictive sense, and the scope of the present disclosure should be defined by claims rather than the foregoing description, and should be construed to include all differences within the scope equivalent thereto.

What is claimed is:

1. A method of generating a navigational route using an integrated electronic chart, the method comprising:
   receiving a plurality of electronic navigational charts (ENCs), each with different scales, from a database;
   extracting at least one overlapping area of the plurality of ENCs;
   integrating the plurality of electronic-charts-ENCs into the integrated electronic chart by applying an overlapping area from an ENC with the largest scale among the plurality of ENCs to a corresponding overlapping area of the at least one overlapping area, based on the at least one overlapping area and a scale;
   dividing the integrated electronic chart into a configurable grid;
   generating an initial route using first object information contained in the configurable grid;
   mapping second object information detected by a sensing device onto the integrated electronic chart; and
   resetting the initial route using the mapped second object information,
   wherein the integrating comprises extracting an object type and an object coordinate from each of the at least one overlapping area, and comparing scales of two ENCs of the plurality of ENCs only when the two ENCs contain the same object type and the same object coordinate.

2. The method of claim 1, wherein the integrating comprises:
   classifying the plurality of ENCs based on the at least one overlapping area;
   selecting one of the classified ENCs as a first ENC; and
   based on an existence of a second ENC electronic chart among the classified ENCs that includes the overlapping area included in the first ENC and has a larger scale than the first ENC, changing the overlapping area of the first ENC to the overlapping area of the second ENC.

3. The method of claim 1, further comprising dividing the integrated electronic chart into the configurable grid using a quadtree according to presence or absence of an object.

4. The method of claim 3, further comprising storing attribute information of the configurable grid in the integrated electronic chart, the attribute information being generated based on information about the configurable grid and information about the object in the configurable grid.

5. The method of claim 4, wherein the attribute information of the grid includes a route setting weight determined based on a distance between the configurable grid and a land.

6. The method of claim 2, wherein the classifying the plurality of ENCs is performed based on one or more of chart numbers, chart names, and code numbers of the plurality of ENCs.

7. The method of claim 3, wherein the dividing the integrated electronic chart into the grid further comprises repeatedly dividing the configurable grid using the quadtree until a resulting grid contains preset object information.

8. The method of claim 1, wherein the dividing the integrated electronic chart further comprises object interpolation based on a plurality of points corresponding to objects included in the integrated electronic chart and edges connecting the plurality of points to each other.

9. A non-transitory computer-readable medium having computer executable instructions that, when executed by a processor, perform the method of claim 1.

10. A route setting device comprising:
    at least one memory; and
    at least one processor,
    wherein the at least one processor is configured to
        receive a plurality of electronic navigational charts (ENCs) from a database, each comprising a configurable grid containing first object information, wherein the plurality of ENCs is combined, thereby creating an integrated electronic chart using an ENC with the largest scale for each overlapping area of the plurality of ENCs,
        receive data including second object information from at least one sensor,
        generate integrated object information by mapping the second object information to the configurable grid based on the first object information and the second object information,
        display the integrated object information,
        generate an initial route using the integrated electronic chart, and
        resetting the initial route using the integrated object information,
    wherein the creating of the integrated electronic chart includes extracting an object type and an object coordinate from each of the at least one overlapping area, and comparing scales of two ENCs of the plurality of ENCs only when the two ENCs contain the same object type and the same object coordinate.

11. The route setting device of claim 10, wherein the at least one processor is further configured to generate the integrated object information by excluding the second object information mapped to the configurable grid containing the first object information.

12. The route setting device of claim 10, wherein the first object information and the second object information include probability information regarding at least one of a presence, a location, a size, a speed, and a direction of an object,
    wherein the at least one processor is further configured to generate integrated probability information by integrating the probability information, and generate the integrated object information by mapping the integrated probability information to the configurable grid.

13. The route setting device of claim 10, wherein the at least one processor is further configured to generate the integrated object information by identifying a subset of a plurality of pieces of second object information indicating the same object sensed in a preset area.

14. The route setting device of claim 10, wherein the at least one processor is further configured to set a collision avoidance route by connecting the configurable grid on which the integrated object information is not mapped or the configurable grid with low collision risks.

15. The route setting device of claim 10, wherein the at least one processor is further configured to
calculate a probability-based collision risk for the configurable grid of the integrated electronic chart based on at least one of the first object information and the second object information, and
set a collision avoidance route based on the probability-based collision risk and a possibility of a host ship avoiding a collision.

16. The route setting device of claim 15, further comprising a display unit configured to display at least one of the integrated object information, the probability-based collision risk, and the collision avoidance route.

17. The route setting device of claim 10, wherein the at least one processor is further configured to set a planned route from an origin to a destination based on the integrated electronic chart.

18. The route setting device of claim 10, wherein the at least one processor is further configured to generate the integrated object information by performing object filtering using land information of the integrated electronic chart and a noise removal algorithm.

19. The route setting device of claim 10, wherein the at least one processor is further configured to generate the integrated object information by selecting only objects corresponding to navigational obstacles based on sensor fusion of the first object information acquired from the integrated electronic chart and the second object information filtered using a noise removal algorithm.

* * * * *